United States Patent
Bunker et al.

(10) Patent No.: US 6,869,270 B2
(45) Date of Patent: Mar. 22, 2005

(54) TURBINE BLADE COVER COOLING APPARATUS AND METHOD OF FABRICATION

(75) Inventors: Ronald Scott Bunker, Niskayuna, NY (US); Frederic Joseph Klug, Schenectady, NY (US); Shyh-Chin Huang, Latham, NY (US)

(73) Assignee: General Electric Company, Niskayuna, NY (US)

( * ) Notice: Subject to any disclaimer, the term of this patent is extended or adjusted under 35 U.S.C. 154(b) by 418 days.

(21) Appl. No.: 10/162,756

(22) Filed: Jun. 6, 2002

(65) Prior Publication Data

US 2003/0228223 A1 Dec. 11, 2003

(51) Int. Cl.$^7$ ................................................ F01D 5/18
(52) U.S. Cl. ................... 416/97 R; 416/97 A; 416/189; 416/229 R
(58) Field of Search ............................ 416/97 R, 97 A, 416/189, 229 R; 415/115; 29/889.2, 889.721

(56) References Cited

U.S. PATENT DOCUMENTS

| | | | |
|---|---|---|---|
| 5,350,277 A | * | 9/1994 | Jacala et al. ............... 416/90 R |
| 5,660,525 A | | 8/1997 | Lee et al. |
| 5,785,496 A | * | 7/1998 | Tomita ..................... 416/97 R |
| 6,000,908 A | | 12/1999 | Bunker |
| 6,179,556 B1 | | 1/2001 | Bunker |
| 6,234,755 B1 | | 5/2001 | Bunker et al. |
| 6,464,460 B2 | * | 10/2002 | El-Nashar et al. ............ 416/92 |

FOREIGN PATENT DOCUMENTS

| | | |
|---|---|---|
| RU | 2101513 | 6/1995 |
| RU | 1533403 A1 | 11/1996 |
| RU | 2122123 C1 | 11/1998 |

OTHER PUBLICATIONS

"Turbine Blade Core Cooling Apparatus and Method of Fabrication," RS Bunker et al., GE docket No. RD–29,163.
"Turbine Blade Wall Cooling Apparatus and Method of Fabrication," RS Bunker et al., GE docket No. RD–RD–29,227.

* cited by examiner

Primary Examiner—Ninh H. Nguyen
(74) Attorney, Agent, or Firm—Patrick K. Patnode; Christian G. Cabou

(57) ABSTRACT

A blade cover cooling apparatus comprises a blade cover top plate, comprising a plurality of upper ribs, a blade cover bottom plate, comprising a plurality of lower ribs. The blade cover top plate is disposed over the blade cover bottom plate. The upper ribs are disposed at a first angle and the lower ribs are disposed at a second angle with respect to the blade circumferential reference line, respectively to form a plurality of flow redirection areas. The blade cover bottom plate is disposed to pass a coolant from the turbine blade to the blade cover top plate. A fabrication method aligns the blade cover top plate and the blade cover bottom plate to form the plurality of flow redirection areas.

51 Claims, 13 Drawing Sheets

TURBINE BLADE COVER COOLING APPARATUS AND METHOD OF FABRICATION

BACKGROUND

The present invention relates generally to both gas turbines and steam turbines, and more particularly to turbine blade cover arrangements in turbine blades. Turbine blade covers are typically cooled to decrease the bulk temperature and maximum temperature of the blade cover material to support higher mechanical loads. Cooling the turbine blade cover affords the designer the ability to improve the aerodynamic performance configuration of the turbine blade cover.

Steam turbines include, but are not limited to, steam turbine power generation equipment and shipboard steam turbine propulsion equipment. Gas turbines include, but are not limited to, gas turbine power generation equipment and gas turbine aircraft engines. An exemplary steam turbine typically contains a high-pressure turbine section, a low-pressure turbine section, or a combination of both, which is rotated by the steam flow. An exemplary gas turbine typically includes a core engine, having a high pressure compressor to compress the air flow entering the core engine, a combustor in which a mixture of fuel and the compressed air is burned to generate a propulsive gas flow, and a high pressure turbine which is rotated by the propulsive gas flow and which is connected by a larger diameter shaft to drive the high pressure compressor. A typical front fan gas turbine aircraft engine adds a low pressure turbine (located aft of the high pressure turbine) connected by a smaller diameter coaxial shaft to drive the front fan (located forward of the high pressure compressor) and to drive an optional low pressure compressor (located between the front fan and the high pressure compressor). The low-pressure compressor sometimes is called a booster compressor or simply a booster.

In the exemplary gas turbine, typically the fan and the high and low pressure compressors and turbines have gas turbine blades each including an airfoil portion attached to a shank portion. In the exemplary steam turbine, typically the high and low pressure turbine sections have steam turbine blades each including an airfoil portion attached to a shank portion. Rotor blades are gas or steam turbine blades attached to a rotating gas or steam turbine rotor discs, respectively. Stator vanes are gas turbine blades or steam turbine blades attached to a non-rotating gas or steam turbine stator casings, respectively. Typically, there are alternating circumferential rows of radially-outwardly extending rotor blades and radially-inwardly extending stator vanes. When present in the gas turbine configuration, at least one of a first and a last row of stator vanes (also called inlet and outlet guide vanes) may have their radially-inward ends also attached to a non-rotating gas turbine stator casing. Counter rotating "stator" vanes are also known in gas turbine designs. Conventional gas and steam turbine blade designs typically have airfoil portions that are made entirely of metal, such as titanium, or are made entirely of a composite. The all-metal blades, including costly wide-chord hollow blades, are heavier in weight, resulting in lower fuel performance and requiring sturdier blade attachments. The blades typically have a blade cover that extends over the top of the airfoil portion of the turbine blade. The blade cover typically provides rigidity to individual blades by covering a plurality of adjacent blades. The blade cover is typically configured with aerodynamic features to minimize stage to stage air or steam leakage in the turbine.

In a gas turbine aircraft application, the gas turbine blades that operate in the hot gas path are exposed to some of the highest temperatures in the gas turbine. Various design schemes have been pursed to increase the longevity of the blades in the hot gas path. By way of example and not limitation, these design schemes include blade coatings, internal cooling of the blades, and internal cooling of the blade covers.

In one common internal core cooling arrangement, a series of radial cooling holes extend through the entire turbine blade. The turbine blade is first manufactured as a solid blade. The solid blade is then drilled using Electro-Chemical Machining (ECM) or Shaped-Tube Electro-Chemical Machining (STEM), to create a plurality of through holes from about a blade root to about a blade tip. The radial cooling holes in axially long blades can be difficult to machine, sometimes requiring drilling from both ends of the blade. The blade with the radial cooling holes tends to have more mass than is desired. The extra mass can be problematic during thermal transients as the interior surfaces and the exterior surfaces of the blade do not respond at the same rate to the thermal transient, which results in thermal stresses. Moreover, the use of radial cooling holes is generally not possible in the leading and trailing edges of the blades, due to the three dimensional curvature of the blade. The blade cover typically has radially drilled cooling holes that overlie the radial cooling holes in the blades after the blade cover is disposed over the blade. The blade cover also typically has drilled passages that direct the coolant to the edges of the blade cover to eject the coolant to the working fluid in the turbine. The coolant absorbs heat from the blade cover to decrease the bulk temperature and maximum temperature of the blade cover material.

The coolant for the internal cooling of the blades and the blade covers typically comes from a cooler temperature part of the turbine or from a separate source of cooling. The coolant is typically either an air-based coolant or a steam-based coolant. The air-based coolant is typically bled either from the compressor section or from a post-compressor region that surrounds the combustion section that is operating at a cooler temperature than the turbine blades and blade covers of concern. The air-based coolant is alternately supplied from a separate off-machine located air supply system. The steam-based coolant is typically supplied from a turbine section that is operating at a cooler temperature than the turbine blades and turbine blade covers of concern. Alternatively, the steam-based coolant is supplied from an independent steam supply (i.e. other steam system or auxiliary boiler). However, providing the coolant to internally cool the turbine blades and turbine blade covers represents internal work to the turbine that reduces an efficiency of the turbine. Additionally, the issues related to directing the flow of the coolant to the areas of highest heat load in the blade cover has created the desire to improve the internal cooling of the blades and blade covers even further.

Accordingly, there is a need for an improved turbine blade cover. What is needed is a blade cover cooling apparatus that allows more aggressively shaped aerodynamic configurations to reduce stage-to-stage leakage and delivers higher cooling effectiveness. What is also needed is a blade cover cooling apparatus cooling scheme that satisfies the blade cover cooling requirements with less impact on the turbine net output.

BRIEF SUMMARY

A blade cover cooling apparatus comprises a blade cover top plate, comprising a plurality of upper ribs, a blade cover bottom plate, comprising a plurality of lower ribs. The blade cover top plate is disposed over the blade cover bottom plate. The upper ribs are disposed at a first angle and the lower ribs are disposed at a second angle with respect to the blade circumferential reference line, respectively to form a plurality of flow redirection areas. The blade cover bottom plate is disposed to pass a coolant from the turbine blade to the blade cover top plate. A fabrication method aligns the blade cover top plate and the blade cover bottom plate to form the plurality of flow redirection areas.

DRAWINGS

These and other features, aspects, and advantages of the present invention will become better understood when the following detailed description is read with reference to the accompanying drawings in which like characters represent like parts throughout the drawings, wherein.

Figure 12:
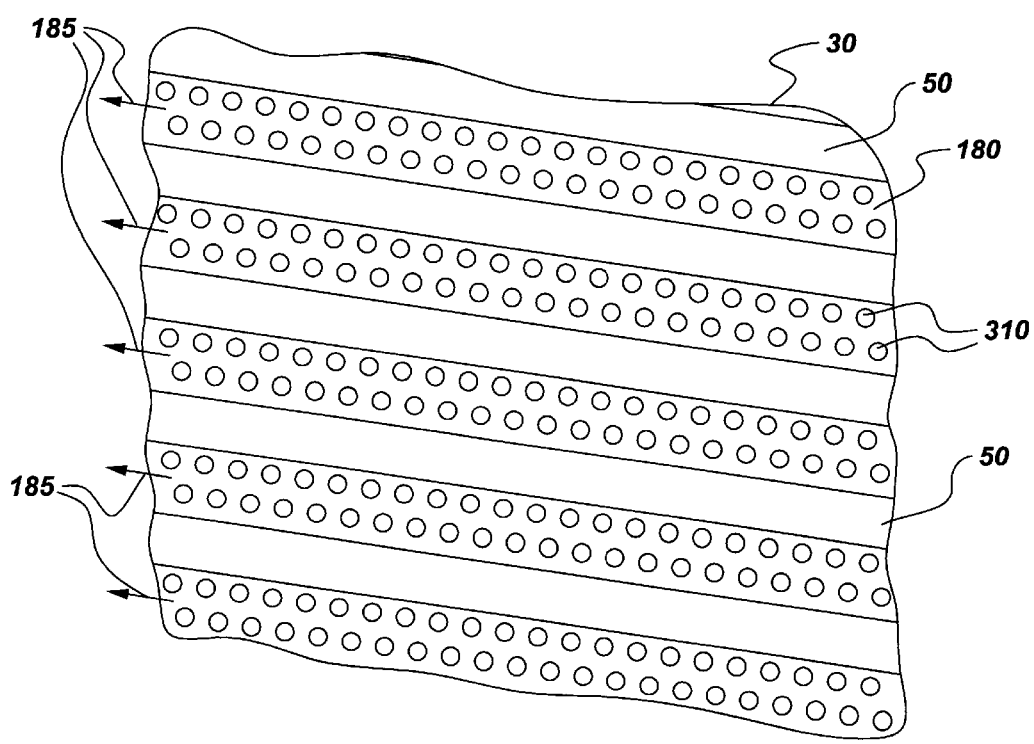
Figure 13:
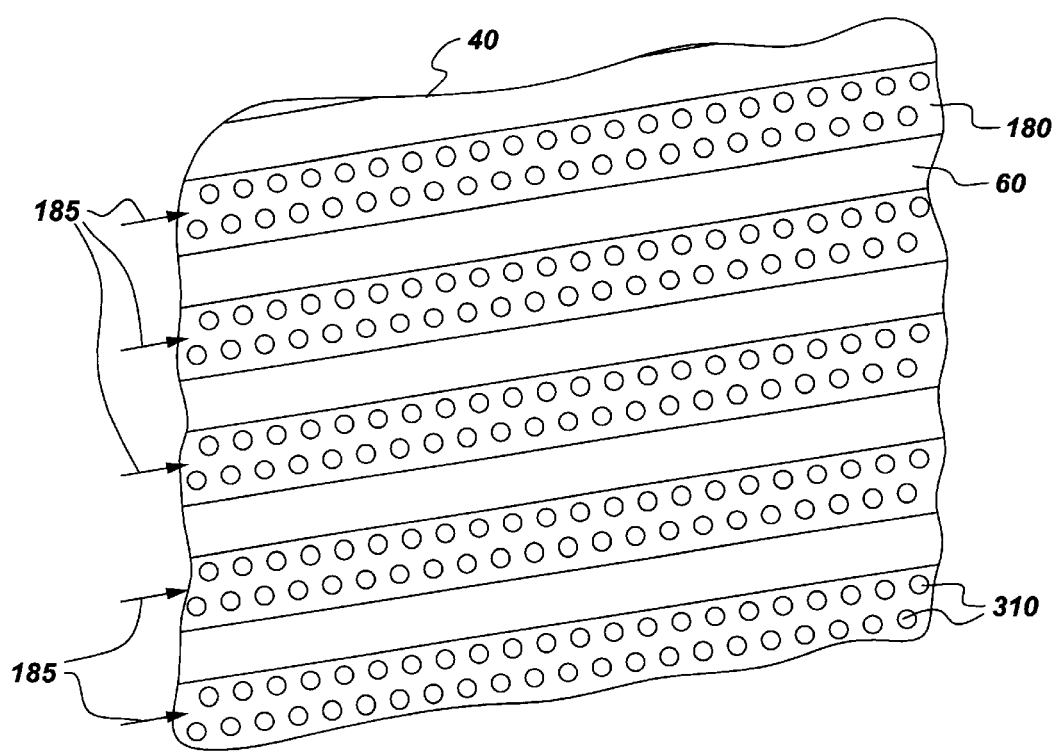

FIG. 12 is a cross sectional view of a portion of the blade cover top plate of the blade cover cooling apparatus having a plurality of concavities disposed thereon in accordance with another embodiment of the present invention; and FIG. 13 is a cross sectional view of a portion of the blade cover bottom plate of the blade cover cooling apparatus having the plurality of concavities disposed thereon in accordance with one embodiment of the present invention.

DESCRIPTION

Figure 1:
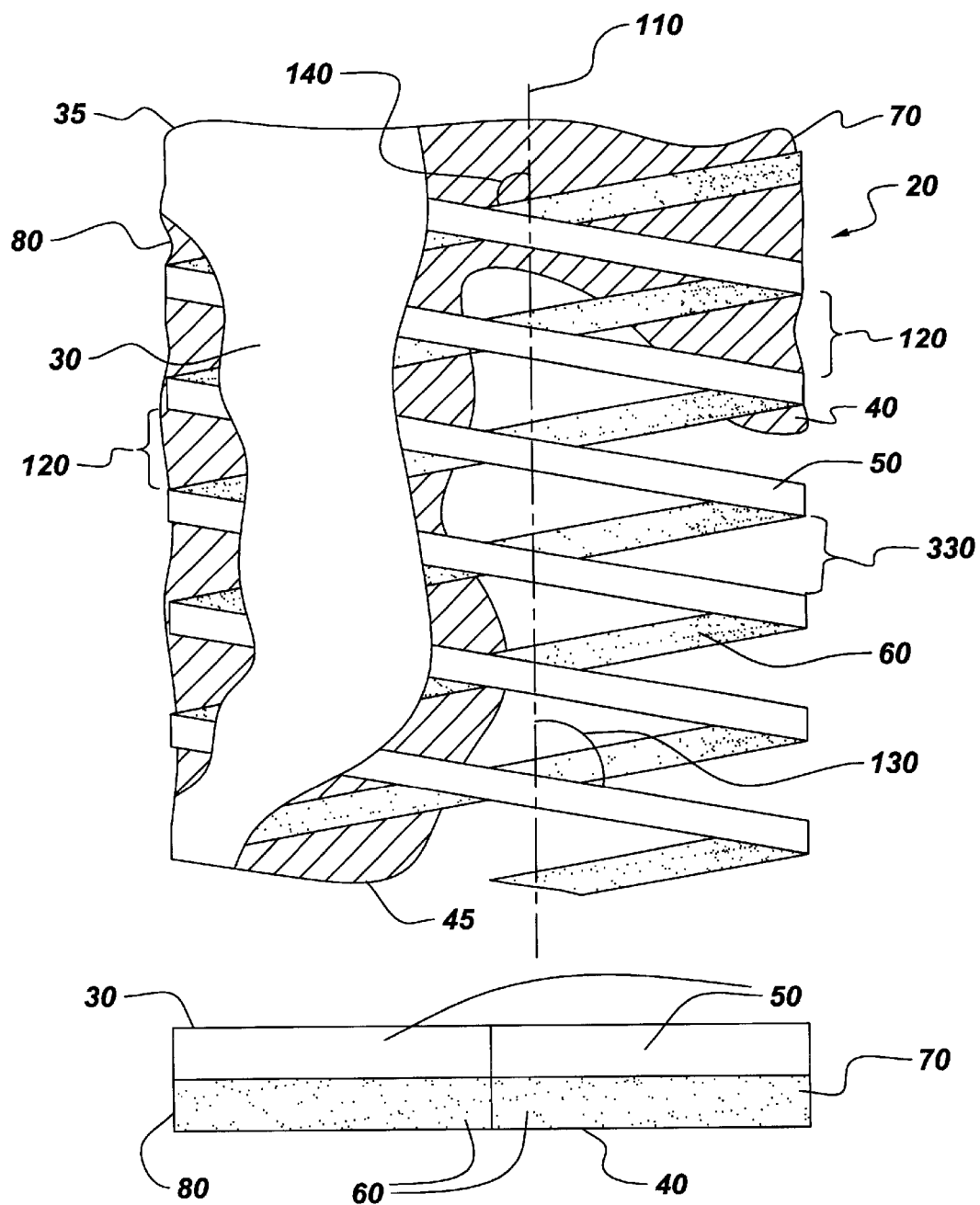
FIG. 1 is a cross sectional view of the blade cover cooling apparatus in accordance with one embodiment of the present invention.
Figure 2:
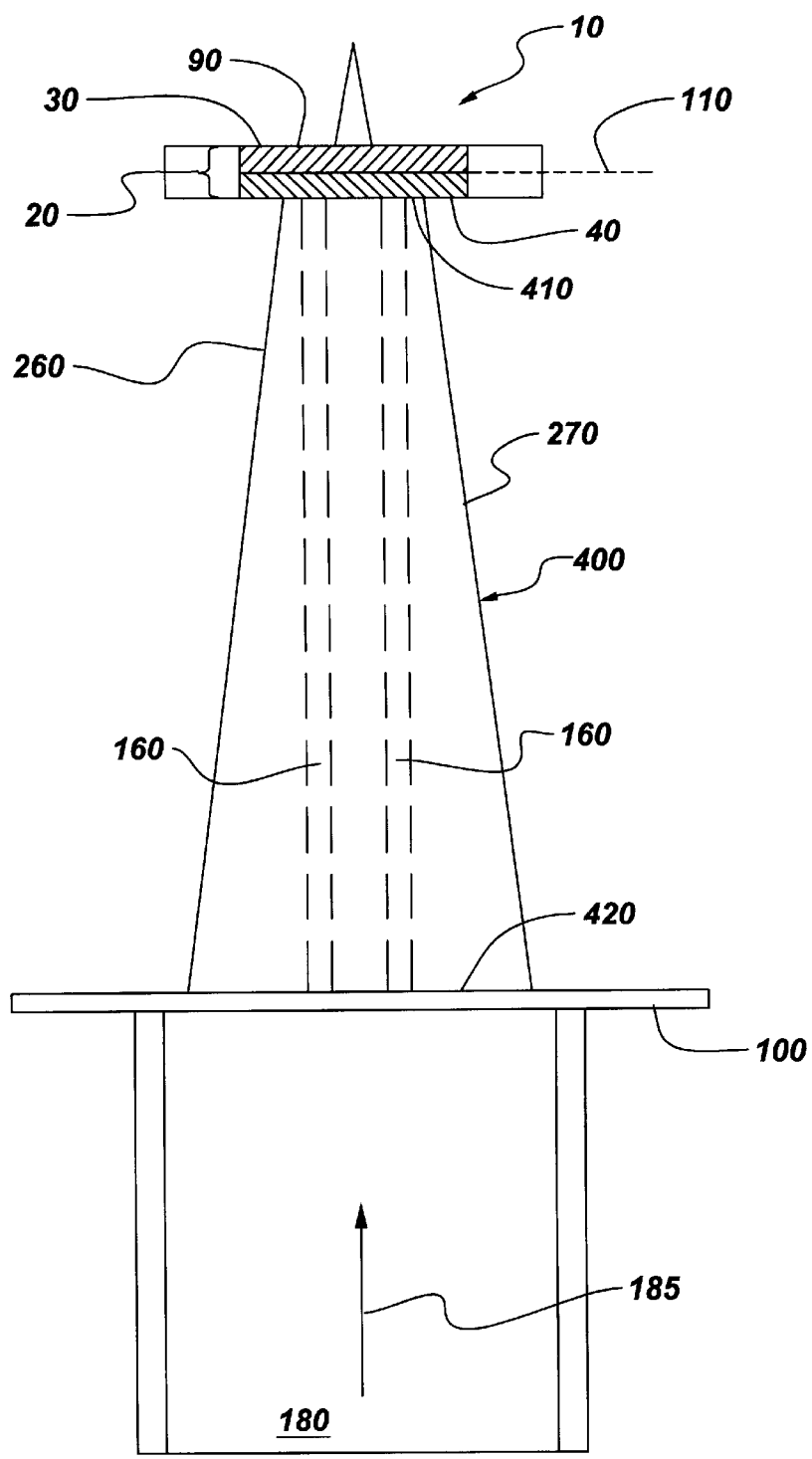
FIG. 2 is a cross sectional view of the turbine blade comprising a blade cover cooling apparatus such as shown in FIG. 1 in accordance with another embodiment of the present invention.

FIG. 1 provides a partial cut-away cross sectional view of a portion of a blade cover cooling apparatus 20 disposed in a blade cover 90 of FIG. 2 of a turbine blade 10. The blade cover cooling apparatus 20 of FIG. 1 comprises a blade cover top plate 30. The blade cover top plate 30 comprises a plurality of upper ribs 50. The blade cover cooling apparatus 20 further comprises a blade cover bottom plate 40. The blade cover bottom plate 40 comprises a plurality of lower ribs 60. The blade cover top plate 30 is disposed over the blade cover bottom plate 40 to form the blade cover 90. The upper ribs 50 are disposed at a first angle 130 with respect to a blade circumferential reference line 110 and the lower ribs 60 are disposed at a second angle 140 with respect to the blade circumferential reference line 110 to form a plurality of flow redirection areas 120. The blade cover bottom plate 40 is disposed to pass a coolant 180 from the turbine blade 10 to the blade cover top plate 30. The first angle 130 is not equal to the second angle 140.

In one embodiment of the present invention, the blade cover cooling apparatus 20 further comprises a blade cover leading edge plate 35, a blade cover trailing edge plate 45, a blade cover suction side plate 70, and a blade cover pressure side plate 80. The blade cover leading edge plate 35 and the blade cover trailing edge plate 45 are typically situated opposite one another with each being disposed to the blade cover top plate 30, the blade cover bottom plate 40, the blade cover suction side plate 70, and the blade cover pressure side plate 80. The blade cover suction side plate 70 is disposed to the blade cover top plate 30, the blade cover bottom plate 40, the blade cover leading edge plate 35, and the blade cover trailing edge plate 45. The blade cover pressure side plate 80 is disposed to the blade cover top plate 30, the blade cover bottom plate 40, the blade cover leading edge plate 35, and the blade cover trailing edge plate 45.

In one embodiment of the present invention, the blade cover top plate 30, the blade cover bottom plate 40, the blade cover leading edge plate 35, the blade cover trailing edge plate 45, the blade cover suction side plate 70, and the blade cover pressure side plate 80 are disposed in an investment casting.

As used herein, the term "turbine blade" refers to both steam turbine blades and gas turbine blades. As used herein, the term "blade cover" refers to both a steam turbine blade cover and a gas turbine blade cover. As used herein, the term "blade cover" refers to both attached tip-shrouds and tip-shrouds. As used herein, the term "blade circumferential reference line" refers to a reference axis and not a physical part of turbine blade 10 of FIG. 2. As used herein, the term "blade circumferential reference line" refers to a reference axis and not a physical part of the blade cover cooling apparatus 20 of FIG. 1. As used herein, the blade circumferential reference line 110 is traced out by the direction of rotation. As used herein, the terms "disposed on", "disposed from", "disposed to", "disposed over", "disposed above" and the like are used to refer to relative locations of items illustrated in the drawings and do not imply structural or operational limitations in the assembled device.

As used herein, the phrase "flow redirection area 120" refers to an area where the coolant 180 changes direction and enters the blade cover top plate 30 and it also refers to an area where the coolant 180 changes direction and enters the blade cover bottom plate 40. While the flow redirection areas 120 shown in FIG. 1 are depicted along the blade cover suction side plate 70 and the blade cover pressure side plate 80, the present invention does not intend to imply a limitation of disposing the flow redirection areas 120 at only those locations. The flow redirection areas 120, in one embodiment of the present invention, are disposed around the perimeter of the blade cover cooling apparatus 20. In another embodiment of the present invention, the flow redirection areas 120 are disposed along portions of the perimeter of the blade cover cooling apparatus 20. The final disposition of the flow redirection areas 120 is left to the artisan to determine based upon the specific design requirements.

In one embodiment of the present invention, "the blade cover bottom plate 40 is disposed to pass the coolant 180 from the turbine blade 10 to the blade cover top plate 30" by virtue of the blade cover bottom plate 40 having an access for the coolant 180 to exit the turbine blade 10 and enter the blade cover 90. The coolant 180 accesses the blade cover 90 from the turbine blade 10 through any one of a number of different cooling conventions. Several typical cooling conventions, provided by way of example and not intended to imply a limitation to the present invention, include: 1) at least one radial hole 385 of FIG. 10 that is disposed in the blade cover bottom plate 40, 2) the portion of blade cover bottom plate 40 where the coolant 180 leaves the turbine blade 10 and enters the blade cover bottom plate 40 is integral to the turbine blade 10 and blade cover 90 combined investment casting, and 3) a portion of the blade cover bottom plate 40 is removed where the blade cover bottom plate 40 is disposed to the turbine blade 10.

FIG. 2 depicts a specific embodiment of the present invention. The blade cover 90, comprising the blade cover cooling apparatus 20, is disposed over an airfoil section 400 of the turbine blade 10. The airfoil section 400 comprises an upper airfoil section 410, a lower airfoil section 420, and a plurality of channels 160. A plurality of channels 160 are disposed from about the upper airfoil surface 410 to about the lower airfoil surface 420. The lower airfoil surface 420 is disposed on the blade root 100. The blade cover bottom plate 40 is disposed on the upper airfoil surface 410. The turbine blade 10 also comprises a turbine blade leading edge 260 and a turbine blade trailing edge 270. The coolant direction arrow 185 generally indicates the direction of a coolant 180 as it enters the turbine blade airfoil section 400.

Figure 3:
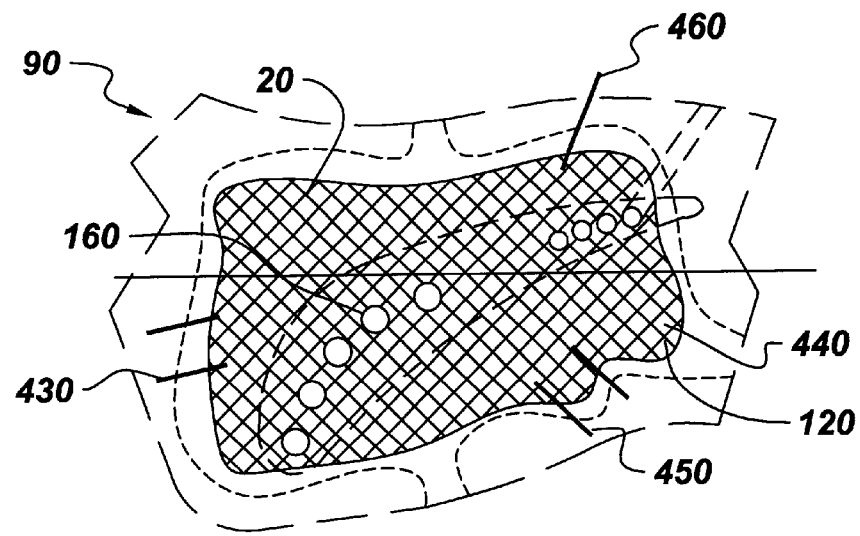
FIG. 3 is a cross sectional view of a portion of the turbine blade comprising the blade cover cooling apparatus in accordance with another embodiment of the present invention.
Figure 3:
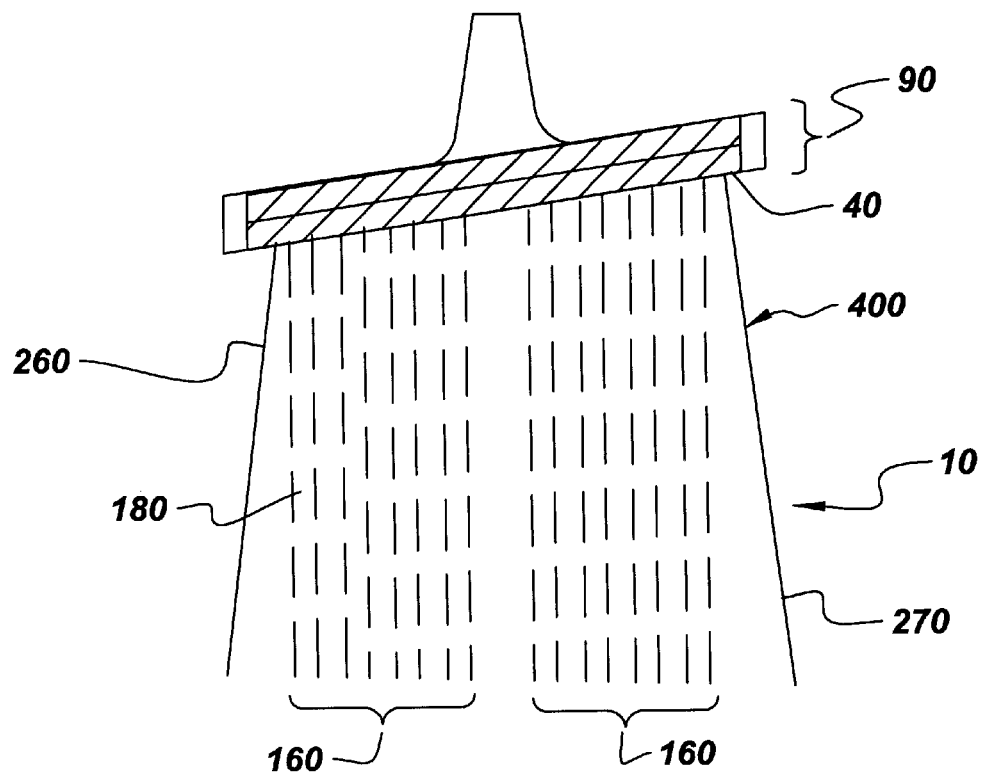

FIG. 3 provides a top view and a side cross sectional view of another embodiment of the present invention, where the blade cover 90 is disposed over a portion of the turbine blade 10 in one embodiment of the present invention. The channels 160 that are configured to provide internal passages for the coolant 180 are also disposed to the blade cover bottom plate 40. The coolant 180 that passes through the channels 160 enters the blade cover bottom plate 40. The coolant 180 then passes through the blade cover bottom plate 40 to at least one of the flow redirection areas 120 where the coolant 180 turns about 90 degrees and enters the blade cover top plate 30. The coolant 180 then exits the blade cover top plate 30 through at least one cooling ejection 430, 440, 450, and 460.

In another embodiment of the present invention, the blade cover top plate 30 and the blade cover bottom plate 40 are disposed so that the coolant 180 passes through the blade cover bottom plate 40 to the blade cover top plate 40. Once the coolant 180 enters the blade cover top plate 30, the coolant 180 then flows along the blade cover top plate 30 until it reaches the flow redirection area 120, where the coolant turns and enters the blade cover bottom plate 40. The coolant 180 then flows towards the perimeter of the blade cover cooling apparatus 20 and exits the blade cover bottom plate 40 through at least one cooling ejection 430, 440, 450, and 460.

In another embodiment of the present invention, the blade cover top plate 30 and the blade cover bottom plate 40 are disposed so that the coolant 180 enters both the blade cover top plate 30 and the blade cover bottom plate 40 at about the same time. (The difference in the time the coolant 180 enters the blade cover top plate 30 and the blade cover bottom plate 40 being related to extra distance that the coolant has to travel to reach the blade cover top plate 30 and the velocity of the coolant 180). The coolant 180 then flows towards the perimeter of the blade cover cooling apparatus 20 and exits the blade cover top plate 30 and the blade cover bottom plate 40 through at least one cooling ejection 430, 440, 450, and 460.

In one embodiment of the present invention, the at least one cooling ejection 430, 440, 450, and 460 is selected from the group consisting of blade cover leading edge cooling ejections 430, blade cover trailing edge cooling ejections 440, blade cover pressure side cooling ejections 450, blade cover suction side cooling ejections 460, and combinations thereof. The present invention discusses various cooling ejections 430, 440, 450, and 460; however, the present invention is not limited to only these above-mentioned cooling ejections 430, 440, 450, and 460. It is left to the artisan to determine where the coolant 180 is ejected, as the coolant 180 can be ejected from a plurality of external surfaces that face the working fluid disposed on both the blade cover top plate 30 and the blade cover bottom plate 40. The working fluid is defined to be selected from the group consisting of steam and the combustion gasses.

Figure 4:
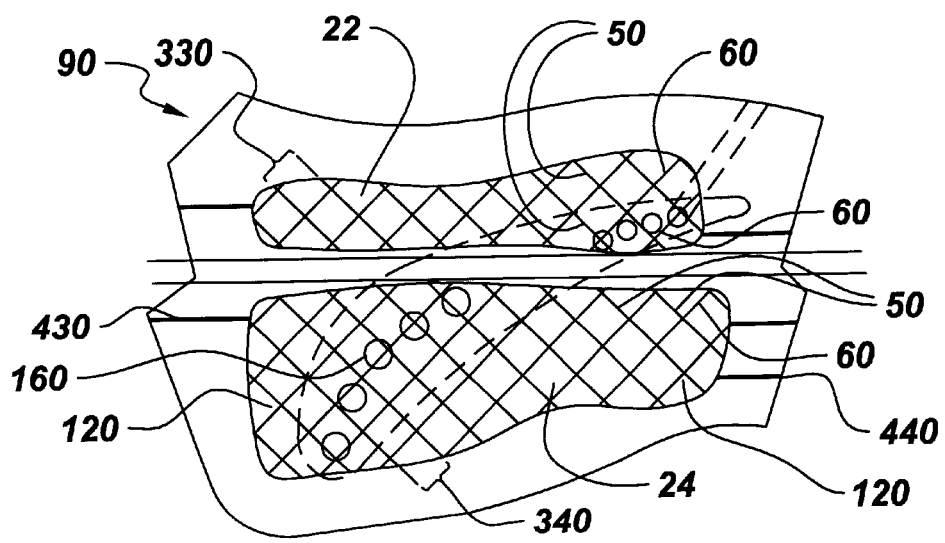
FIG. 4 is a cross sectional view of a portion of the turbine blade comprising a blade cover pressure edge section and a blade cover suction edge section in accordance with still another embodiment of the present invention.
Figure 4:
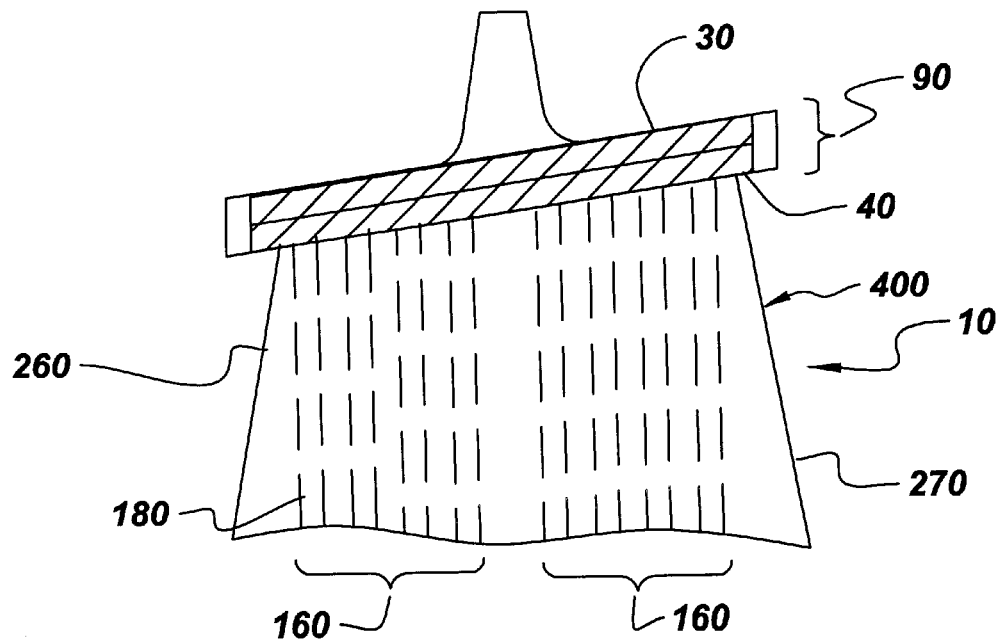

FIG. 4 provides a top view and a side cross sectional view of another embodiment of the present invention, where the blade cover cooling apparatus 20 is divided into a blade cover suction edge section 22 and a blade cover pressure edge section 24 in one embodiment of the present invention. FIG. 4 depicts splitting the blade cover cooling apparatus 20 into two sections, in other embodiments; for example, the blade cover cooling apparatus 20 is split into multiple sections. Both the blade cover suction edge section 22 and the blade cover pressure edge section 24 comprises the blade cover bottom plate 40 and the blade cover top plate 30. The upper ribs 50 and the lower ribs 60 in the blade cover suction edge section 22 have a first rib spacing 330. The upper ribs 50 and the lower ribs 60 in the blade cover pressure edge section 24 have a second rib spacing 340. The first rib spacing 330 and the second rib spacing 340 are disposed to control the coolant 180 in the blade cover suction edge section 22 and the blade cover pressure edge section 24, respectively. The channels 160 in the airfoil section 400 are disposed to deliver the coolant 180 to both the blade cover suction edge section 22 and the blade cover pressure edge section 24. Exemplary turbine blade airfoil internal cooling configurations are provided in the commonly assigned patent application General Electric Docket No. RD-29163, Turbine Blade Core Cooling Apparatus and Method of Fabrication, R. S. Bunker et al., filed concurrently herewith and incorporated herein by reference in its entirety.

In one embodiment of the present invention, the blade cover suction edge section 22 is configured with at least one cooling ejection 430, 440, 450, and 460, where the ejections are as described above.

In another embodiment of the present invention, at least one of the blade cover suction edge section 22 and the blade cover pressure edge section 24 is configured with at least one cooling ejection 430, 440, 450, and 460, where the ejections are as described above.

Figure 5:
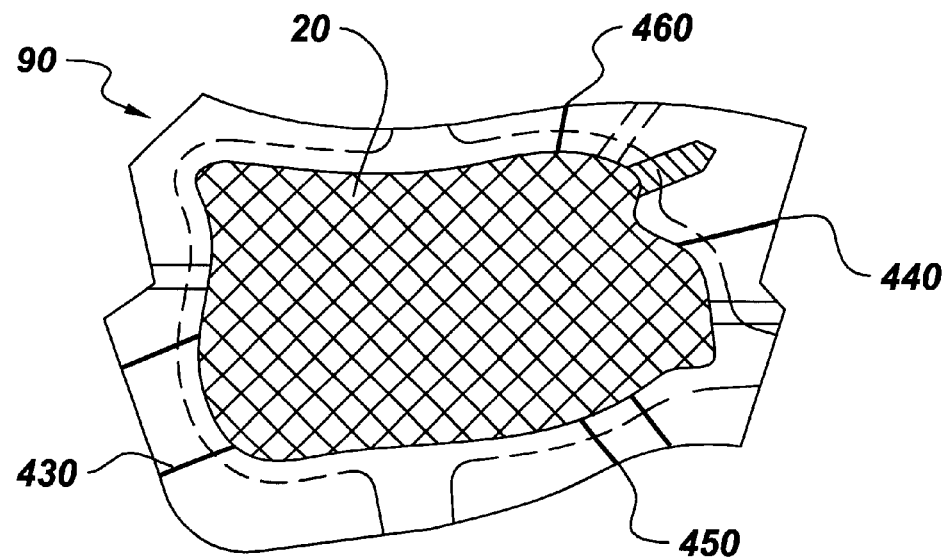
FIG. 5 is a cross sectional view of a portion of the turbine blade comprising the blade cover cooling apparatus disposed over a blade cooling section in accordance with another embodiment of the present invention.
Figure 5:
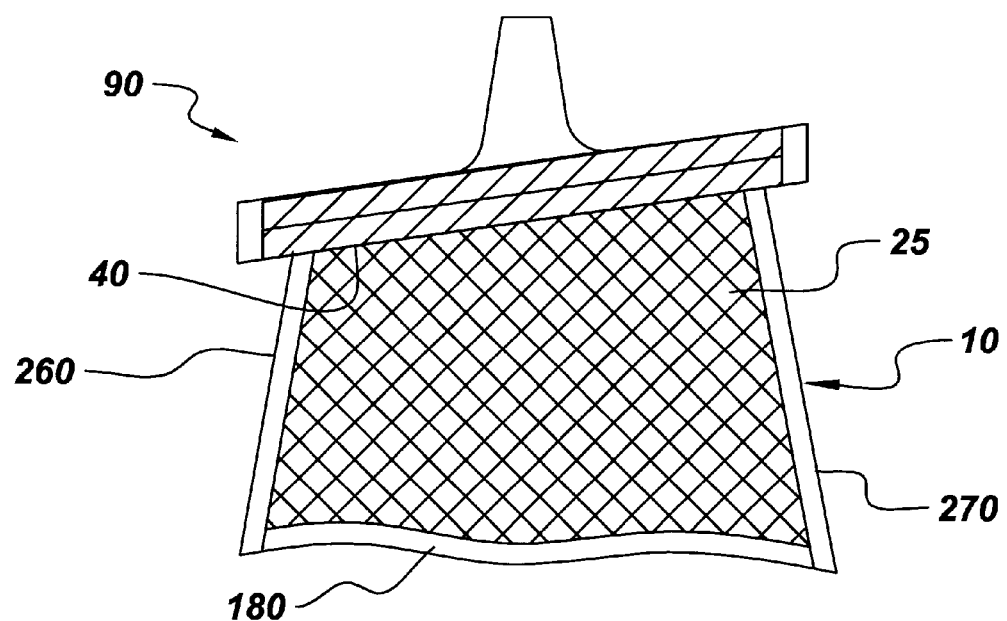

FIG. 5 provides a top view and a side cross sectional view of another embodiment of the present invention, where the turbine blade 10 further comprises a blade cooling section 25. The blade cooling section 25 is designed to cool the internal region of the turbine blade 10 by passing the coolant 180 through the blade cooling section 25, where the coolant 25 picks up heat from the turbine blade 10. Exemplary turbine blade airfoil internal cooling configurations, such as the blade cooling section 25, are provided in the commonly assigned patent application General Electric Docket No. RD-29163, Turbine Blade Core Cooling Apparatus and Method of Fabrication, R. S. Bunker et al., filed concurrently herewith and incorporated herein by reference in its entirety as noted above. In one embodiment of the present invention, the blade cooling section 25 is disposed from the blade cover 90 to the blade root 100 (not shown in FIG. 5). In one embodiment of the present invention, the blade cooling section 25 is disposed from about the turbine blade leading edge 260 to about the turbine blade trailing edge 270. The blade cooling apparatus 25 is disposed to pass the coolant 180 to the blade cover bottom plate 40. While FIG. 5 depicts the blade cooling section 25 being disposed from about the turbine blade leading edge 260 to about the turbine blade trailing edge 270, the above identified location of the blade cooling section 25 is not intended to imply a limitation to the present invention. The blade cooling section 25 can have varying widths and it is not required to be disposed to the turbine blade leading edge 260. The blade cooling section 25 is also not required to be disposed to the turbine blade trailing edge 270. Additionally, the blade cooling section 25 is not required to be disposed to the blade root 100. In one embodiment of the present invention, a coolant communication means (i.e. the channels 160 of FIG. 3) is provided from the blade root 100 to the blade cooling section 25 of FIG. 5 when the blade cooling section 25 is located above the elevation of the blade root 100. Alternately, the blade cooling section 25 is not required to be disposed to the blade cover 90. In one embodiment of the present invention, the coolant communication means (i.e. the channel 160 of FIG. 3) is provided from the blade cover 90 of FIG. 5 to the blade cooling section 25 when the blade cooling section 25 is located below the elevation of the blade cover 90.

Figure 6:
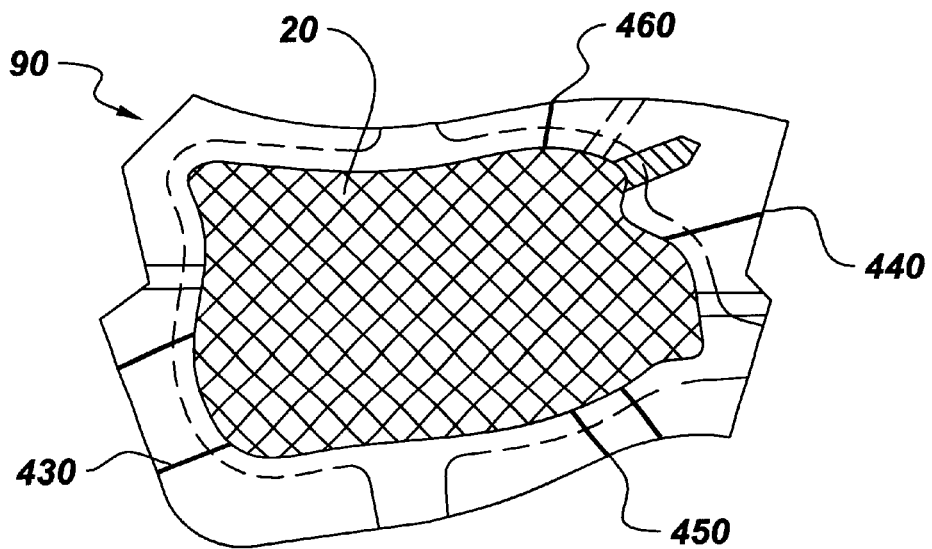
FIG. 6 is a cross sectional view of a portion of a turbine blade similar to that of FIG. 5 and further comprising a dividing rib that separates the blade cooling section.
Figure 6:
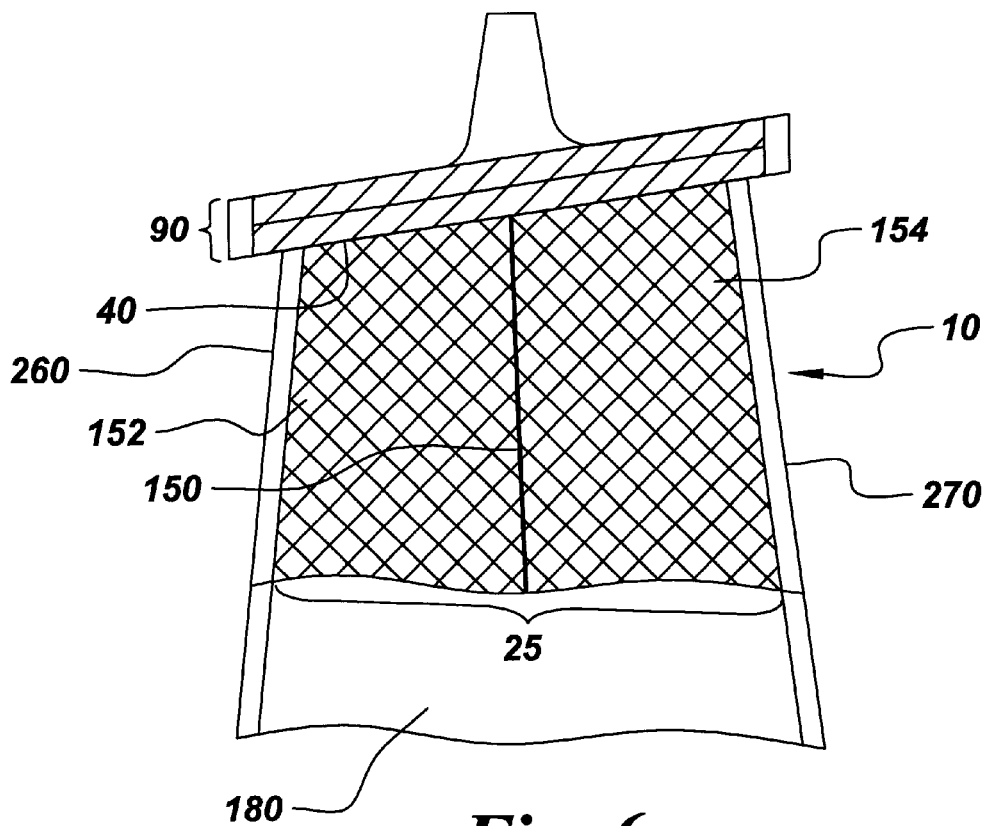

FIG. 6 provides a top view and a side cross sectional view of another embodiment of the present invention, where the turbine blade 10 further comprises at least one dividing rib 150 and the blade cooling section 25. In one embodiment of the present invention, the blade cooling section 25 is disposed from about the blade cover 90 to about the blade root 100 (not shown in FIG. 6). In one embodiment of the present invention, the blade cooling section 25 is disposed from about the turbine blade leading edge 260 to about the turbine blade trailing edge 270. The dividing rib 150 is disposed from about the blade cover 90 to about the blade root 100, and the dividing rib 150 divides the blade cooling apparatus 25 into a leading edge cooling section 152 and a trailing edge cooling section 154. The leading edge cooling section 152 and the trailing edge cooling section 154 are configured to pass the coolant 180 to the blade cover bottom plate 40.

Additionally, the leading edge cooling section 152 is not required to be disposed to the blade cover 90. In addition, the leading edge cooling section 152 is not required to be disposed to the blade root 100. In one embodiment of the present invention, the leading edge cooling section 152 is located above the elevation of the blade root 100, and the coolant communication means (i.e. the channels 160 of FIG. 3) is disposed from the blade root 100 to the leading edge cooling section 152. In one embodiment of the present invention, the trailing edge cooling section 154 is located above the elevation of the blade root 100, and the coolant communication means (i.e. the channels 160 of FIG. 3) is disposed from the blade root 100 to the trailing edge cooling section 154. In one embodiment of the present invention, the leading edge cooling section 152 is located below the elevation of the blade cover 90, and the coolant communication means (i.e. the channel 160 of FIG. 3) is disposed from the blade cover 90 to the leading edge cooling section 152. In one embodiment of the present invention, the trailing edge cooling section 154 is located below the elevation of the blade cover 90, and the coolant communication means (i.e. the channel 160 of FIG. 3) is disposed from the blade cover 90 to the trailing edge cooling section 154.

Figure 7:
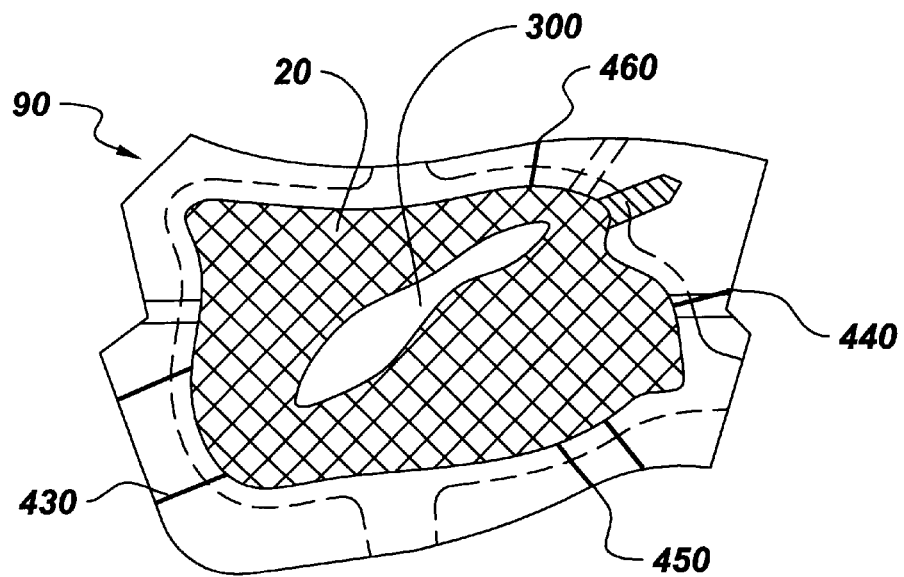
FIG. 7 is a cross sectional view of a portion of a turbine blade similar to that of FIG. 5 and further comprising a target area disposed adjacent to the blade cover cooling apparatus in accordance with another embodiment of the present invention.
Figure 7:
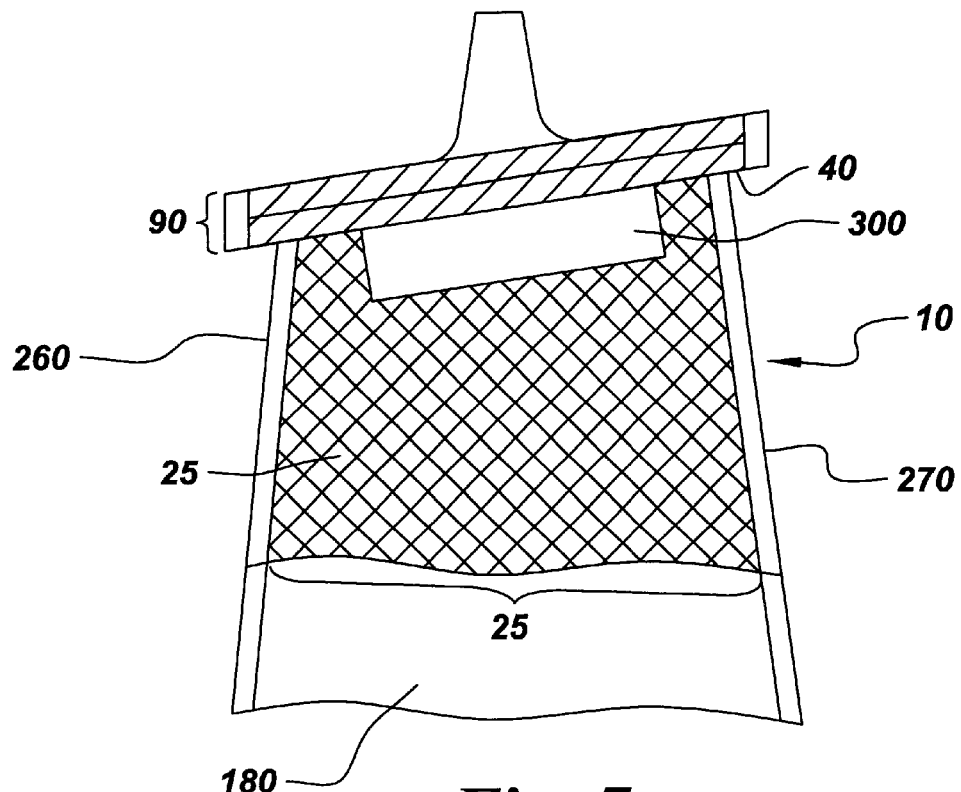

FIG. 7 provides a top view and a side cross sectional view of another embodiment of the present invention, where the blade cooling apparatus 25 further comprises a target area 300. The upper ribs 50 and the lower ribs 60 are spaced apart from the target area 300. The target area 300 is an open area that offers lower flow resistance to the coolant 180 compared to the other areas of the tip turning cooling apparatus 400. The blade cover bottom plate 40 is disposed over at least one edge of the target area 300. The target area 300 is configured to pass the coolant 180 to the blade cover bottom plate 40. The sizing of the target area 300 is determined by the artisan to balance the requirements for cooling the blade cover 90 with the constraints of maintaining pressure drops of the coolant 180 through the turbine blade 10 and the blade cover 90.

Figure 8:
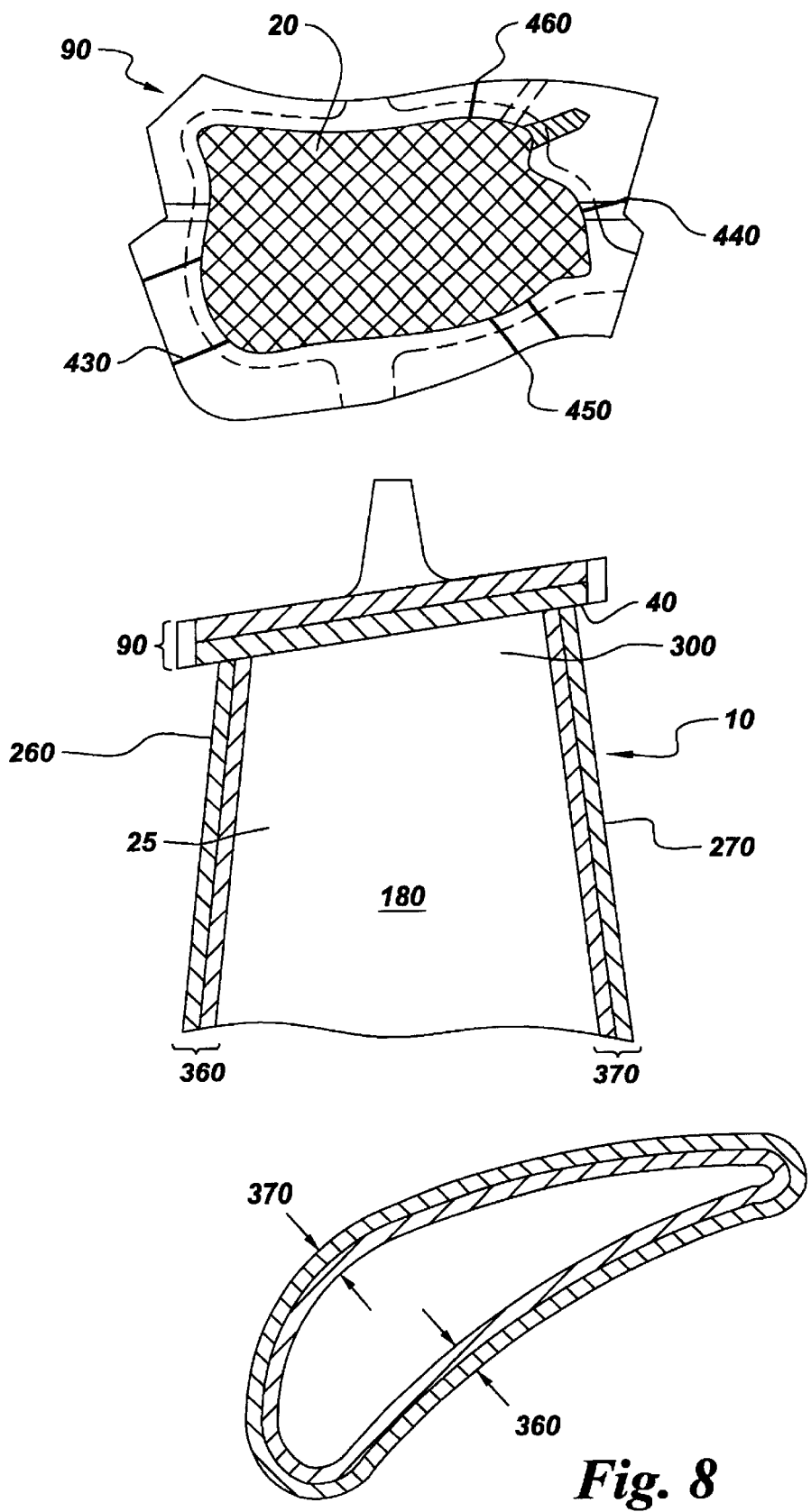
FIG. 8 is a cross sectional view of a portion of a turbine blade comprising a pressure side double wall and a suction side double wall, where the blade cover cooling apparatus is disposed over both the pressure side double wall and the suction side double wall in accordance with another embodiment of the present invention.

FIG. 8 provides a top view and a side cross sectional view of another embodiment of the present invention, where the turbine blade 10 comprises a pressure side double wall 360 and a suction side double wall 370. The pressure side double wall 360 and the suction side double wall 370 are disposed from the blade cover 90 to the blade root 100. In one embodiment of the present invention, the pressure side double wall 360 and the suction side double wall 370 are disposed to pass the coolant 180 to the blade cover bottom plate 40. An exemplary turbine blade airfoil double wall configuration is provided in the commonly assigned patent application General Electric Docket No. RD-29227, Turbine Blade Double Wall and Method of Fabrication, R. S. Bunker et al., filed concurrently herewith and incorporated herein by reference in its entirety.

Figure 9:
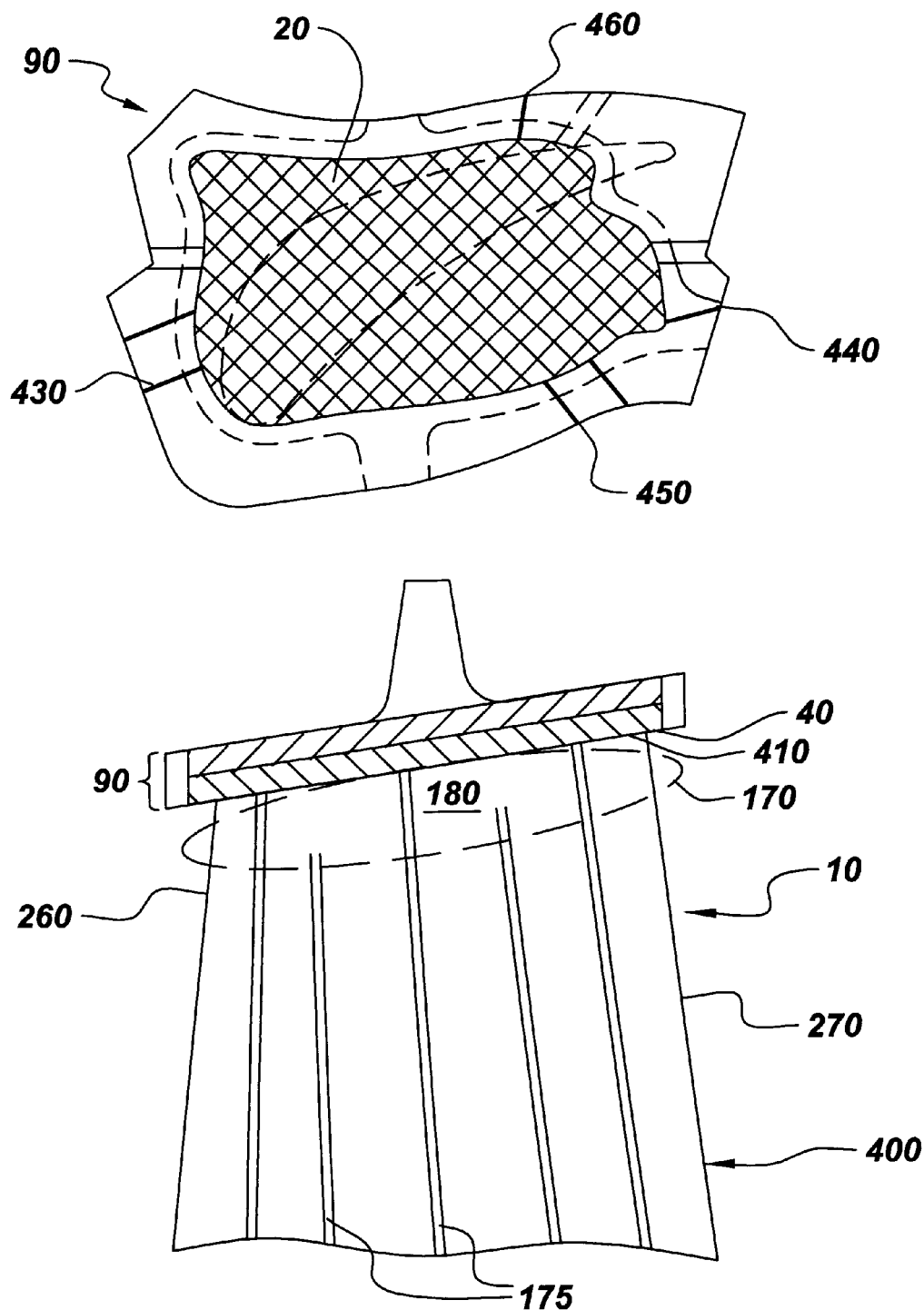
FIG. 9 is a cross sectional view of a portion of the turbine blade comprising a plurality of dividers, where the blade cover cooling apparatus is disposed on at least one of the dividers in accordance with another embodiment of the present invention.

FIG. 9 provides a top view and a side cross sectional view of another embodiment of the present invention, where the turbine blade 10 further comprises the airfoil section 400 as described above. The airfoil section 400 further comprises a plurality of dividers 175. In one embodiment of the present invention, the dividers 175 are disposed from about the upper airfoil surface 410 to about the lower airfoil surface 420 (not shown in FIG. 9) to direct the coolant 180 through the airfoil section 400 as well as directing the coolant 180 to the blade cover bottom plate 40. In a specific embodiment of the present invention, every other divider 175 is disposed to connect to the blade cover bottom plate 40 and is further typically disposed to be spaced apart from the blade root 100 (not shown in FIG. 9) from about the turbine blade trailing edge 270 to about the turbine blade leading edge 260. The dividers 175 are disposed to control the flow of the coolant 180 through the turbine blade 10.

Figure 10:
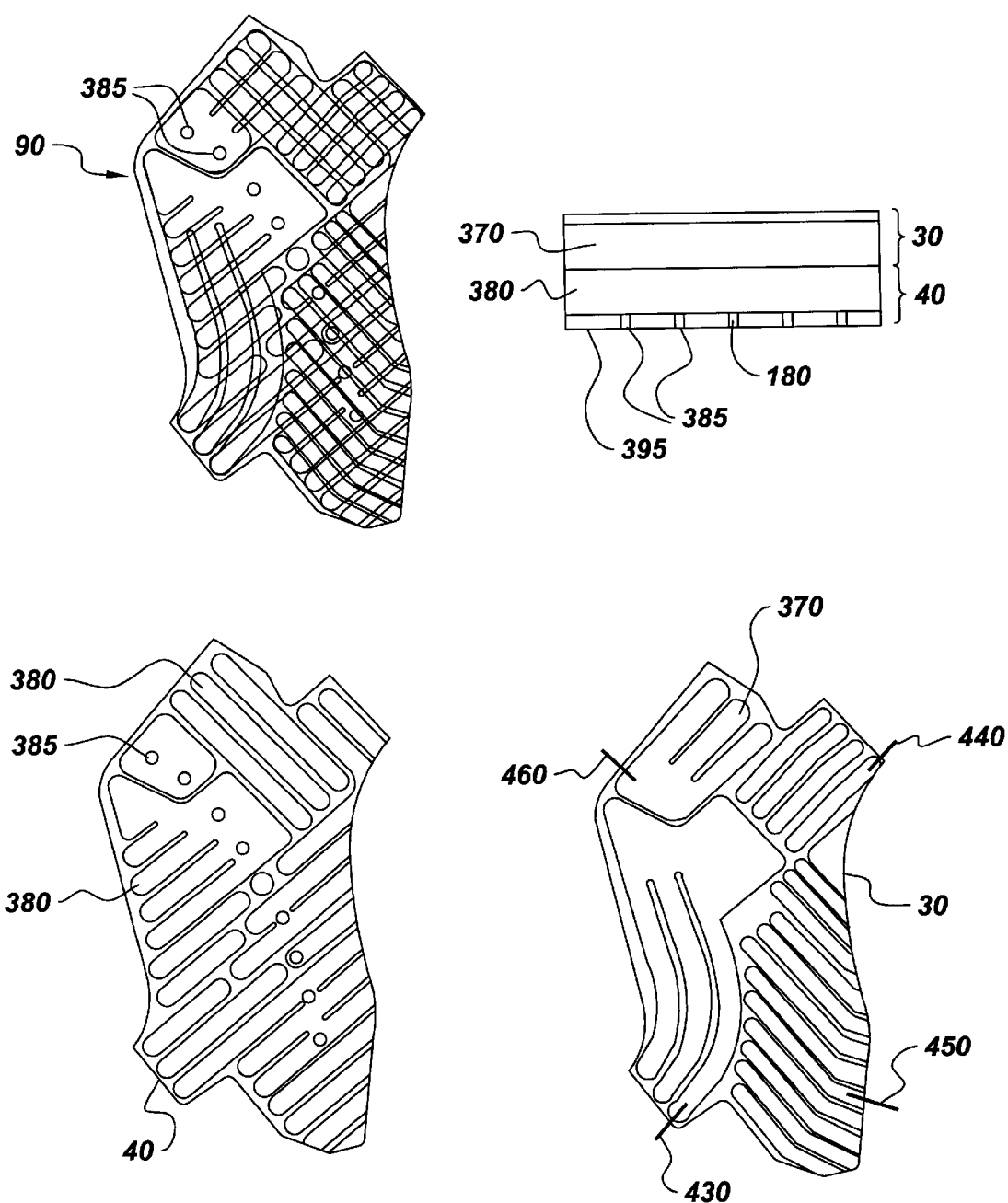
FIG. 10 is a cross sectional view of a portion of the turbine blade comprising the blade cover cooling apparatus, where the blade cover cooling apparatus further comprises blade cover bottom plate channels and blade cover top plate channels in accordance with another embodiment of the present invention.

FIG. 10 provides a top view of blade cover bottom plate 40, blade cover top plate 30, assembled blade cover 90 and a side cross sectional view of the blade cover 90 that depicts another embodiment of the present invention. In one embodiment of the present invention, the blade cover cooling apparatus 20 comprises the blade cover top plate 30, where the blade cover top plate 30 comprises a plurality of top cover plate channels 370. The blade cover cooling apparatus 20 further comprises the blade cover bottom plate 40, where the blade cover bottom plate 40 comprises a plurality of blade cover bottom plate channels 390. The blade cover top plate 30 is disposed over the blade cover bottom plate 40 to form the blade cover 90. The blade cover bottom plate channels 390 are disposed to intersect the blade cover top plate channels 380. The blade cover 90 is configured to pass the coolant 180 from the blade cover bottom plate 40 to the blade cover top plate 30. The above discussed blade cooling internal cooling approaches will work with the blade cover 90 comprising the bottom cover plate channels 380 and the top cover plate channels 370. In one embodiment of the present invention, at least one radial hole 385 is disposed from a blade side 395 of the blade cover bottom plate 40 to intersect with at least one bottom cover plate channel 390. The blade cover bottom plate 40 is configured so that the coolant 180 that enters the blade cover bottom plate 40 passes through to at least one of the top cover plate channels 370 of the blade cover top plate 30. The coolant 180 then exits the blade cover top plate 30 through at least one cooling ejection 430, 440, 450, and 460. The cooling ejections are the same as discussed above with respect to FIG. 4.

In one embodiment of the present invention, the at least one radial hole 385 of FIG. 10 is disposed from a blade side 395 of the blade cover bottom plate 40 and through the blade cover bottom plate, so as to intersect with at least one top cover plate channel 380 in the blade cover top plate 30. The blade cover top plate 40 is configured so that the coolant 180 that passes through the blade cover bottom plate 40 and enters to the at least one of the blade cover top plate channels 370 of the blade cover top plate 30, passes through the blade cover top plate channels until it passes through to the blade cover bottom plate cover 40. The coolant 180 then exits the blade cover bottom plate 40 through the at least one cooling ejection 430, 440, 450, and 460. The cooling ejections are the same as discussed above with respect to FIG. 4.

In another embodiment of the present invention, at least one radial hole 385 of FIG. 10 is disposed from a blade side 395 of the blade cover bottom plate 40 to intersect with the at least one blade cover bottom plate channel 390 and the at least one blade cover top plate channel 380. The blade cover bottom plate 40 and the blade cover top plate 30 are configured so that the coolant 180 passes through both the at least one blade cover top plate channel 380 of the blade cover top plate 30 and the at least one blade cover top plate channel 390 of the blade cover bottom plate channel 390. The coolant 180 then exits both the blade cover top plate 30 and the blade cover bottom plate 40 through at least one cooling ejection 430, 440, 450, and 460. The cooling ejections are the same as discussed above with respect to FIG. 4.

In one embodiment of the present invention, the blade cover cooling apparatus 20 further comprises at least a portion of one of the blade cover top plate channels 380, the blade cover top plate 30, the blade cover bottom plate channels 390, and the blade cover bottom plate 40 that is disposed to contact the coolant 180 has the plurality of concavities 310 thereon.

In one embodiment of the present invention, the at least one top cover plate channel 370 is produced by processes selected from the group consisting of ECM, STEM, investment casting, and combinations thereof.

In one embodiment of the present invention, the at least one bottom cover plate channel 390 is produced by processes selected from the group consisting of ECM, STEM, investment casting, and combinations thereof.

In one embodiment of the present invention, the at least one radial hole 385 is produced by processes selected from the group consisting of ECM, STEM, investment casting, and combinations thereof.

Figure 11:
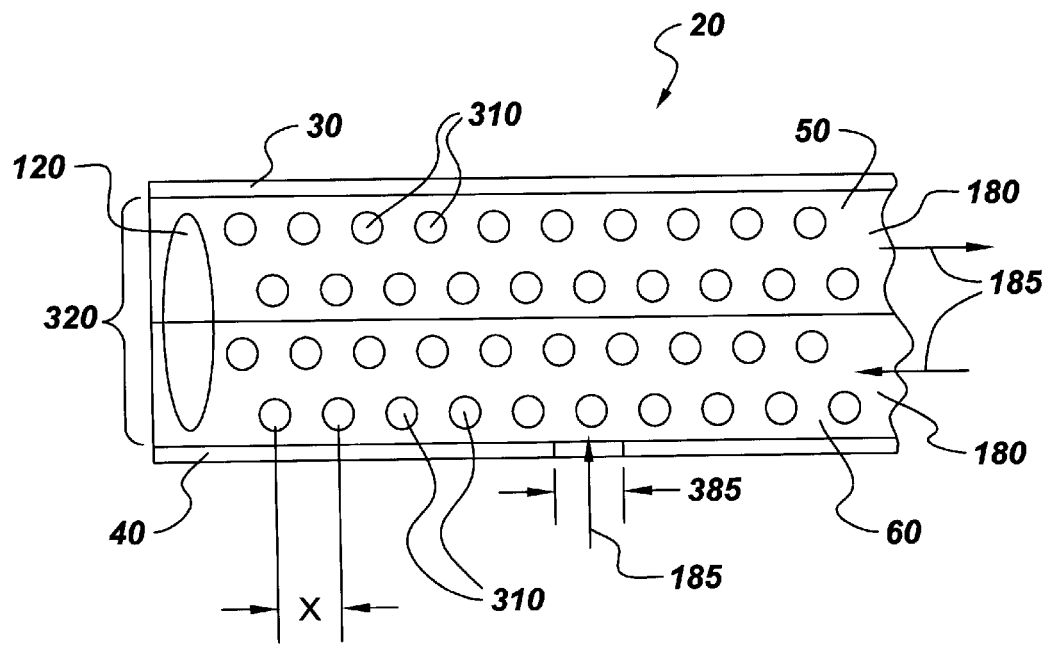
FIG. 11 is a cross sectional view of a portion of the blade cover cooling apparatus having a plurality of concavities disposed thereon in accordance with another embodiment of the present invention.
Figure 11:
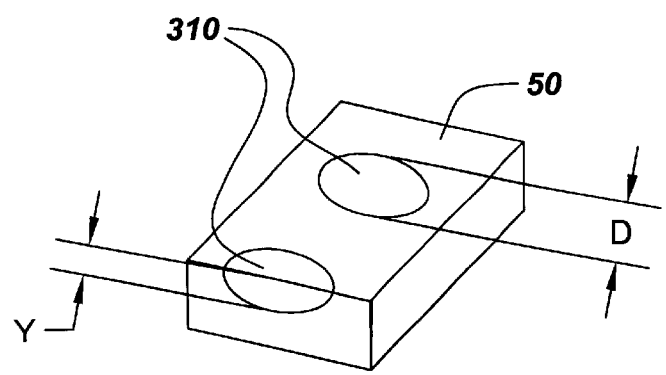

FIGS. 11–13 provide side cross sectional view of other embodiments of the present invention, where a plurality of surface concavities 310 are disposed on at least a portion of at least one of the upper ribs 50 of FIG. 11, the lower ribs 60, the blade cover top plate 30 FIG. 12, and the blade cover bottom plate 40 of FIG. 13 that faces the coolant 180. As used herein, the term "concavity" refers to depressions, indentations, dimples, pits, and any other type and shape of a discrete sinkhole. In one more specific embodiment of the present invention, the shape of the concavities 310 is typically hemispherical. In another embodiment of the present invention, the shape of the concavities 310 is typically inverted. In another embodiment of the present invention, the shape of the concavities 310 is typically truncated conically shaped. In an alternative embodiment, the shape of the concavities 310 is typically any sector of a full hemisphere.

In one specific embodiment of the present invention, the concavities 310 are formed on the abovementioned surfaces in a pattern that serves to enhance heat transfer from the upper rib 50 of FIG. 11, lower rib 60, the blade cover top plate 30 of FIG. 12, the blade cover bottom plate 40 of FIG. 13, to the coolant 180. The concavities 310 of FIG. 11 enhance the heat transfer by disrupting the flow of the coolant 180 past the surface of the upper rib 50 and the lower rib 60 that faces the coolant 180. The concavities 310 of FIG. 12 enhance the heat transfer by disrupting the flow of the coolant 180 past the surface of the blade cover top plate 30 that faces the coolant 180. The concavities 310 of FIG. 13 enhance the heat transfer by disrupting the flow of the coolant 180 past the surface of the blade cover bottom plate 40 that faces the coolant 180. The disruption of the coolant 180 adjacent to the concavities 310 is caused by the hydrodynamic interaction of the coolant 180 with the concavities 310.

In one embodiment of the present invention, the maximum depth "Y" of FIG. 11 of each of the concavities 310 typically remains constant along the surface of the blade cover top plate 30, the blade cover top plate 30, the upper rib 50, and the lower rib 60. The maximum depth "Y" is generally in the range from about 0.10 to about 0.50 times the concavity surface diameter "D". In addition, the maximum depth "Y" of the concavities 310 is in the range from about 0.002 inches to about 0.125 inches. The center-to-center spacing "X" of the concavities 310 is generally in the range from about 1.1 to about 2 times the surface diameter "D" of the concavities 310.

In one embodiment of the present invention, the concavities are typically formed by using a pulse electrochemical machining (PECM) process. In an alternative embodiment of the present invention, the concavities 310 are typically formed by using an electro-discharge machining (EDM) process. In another embodiment of the present invention, the concavities are typically formed as part of the investment casting process.

The present invention provides a method embodiment of fabricating the blade cover cooling apparatus 20 of FIG. 2 disposed in the blade cover 90 for the turbine blade 10. The method comprises aligning the blade cover top plate 30 of FIG. 1, where the blade cover top plate 30 comprises the plurality of upper ribs 50 disposed at the first angle 130 with respect to the blade circumferential reference line 110, and the blade cover bottom plate 40, where the blade cover bottom plate 40 comprises the plurality of lower ribs 60 disposed at the second angle with respect to the blade circumferential reference line 110 to form the plurality of flow redirection areas 120 between the blade cover top plate 30 and the blade cover bottom plate 40.

In one embodiment of the present invention, the method further comprises utilizing the ranges for the first angle 130 and the second angle 140 as provided above.

In one embodiment of the present invention, the method further comprises, prior to aligning, fabricating the blade cover top plate 30 and the blade cover bottom plate 40 by a process selected from a group consisting of investment casting, diffusion bonding, electron beam, and any combination thereof.

In one embodiment of the present invention, where aligning in the method comprises providing an investment casting mold and an investment core which comprises at least the flow redirection areas 120, the upper ribs 50, and the lower ribs 60. The method further comprises pouring a blade cover material so as to form an investment casting, where the investment casting comprises the blade cover top plate 30, the blade cover bottom plate 40, the upper ribs 50, and the lower ribs 60.

In one embodiment of the present invention, "aligning" in the method comprises joining the blade cover top plate 30 and the blade cover bottom plate 40.

In one embodiment of the present invention, the method further comprises disposing the blade cover leading edge plate 35 of FIG. 1 to the blade cover top plate 30, the blade cover bottom plate 40, the blade cover suction side plate 70, and the blade cover pressure side plate 80. The method further comprises disposing the blade cover trailing edge plate 45 to the blade cover top plate 30, the blade cover bottom plate 40, the blade cover suction side plate 70, and the blade cover pressure side plate 80. The method further comprises disposing the blade cover suction side plate 70 to the blade cover top plate 30, the blade cover bottom plate 40, the blade cover leading edge plate 35, and the blade cover trailing edge plate 45. The method further comprises disposing the blade cover pressure side plate 80 to the blade cover top plate 30, the blade cover bottom plate 40, the blade cover leading edge plate 35, and the blade cover trailing edge plate 45.

In one embodiment of the present invention, the method further comprises disposing the blade cover top plate 30, the blade cover bottom plate 40, the blade cover leading edge plate 35, the blade cover trailing edge plate 45, the blade cover suction side plate 70, and the blade cover pressure side plate 80 in the investment casting.

In one embodiment of the present invention, the method further comprises disposing at least one channel 160 of FIG. 3 from about the blade root 100 to the blade cover bottom plate 40. The channel is configured to provide internal passages for the coolant 180, where the coolant 180 that passes through the channels 160 enters the blade cover bottom plate 40 then passes through the blade cover bottom plate 40 to at least one of the flow redirection areas 120. The coolant 180 turns about 90 degrees and enters the blade cover top plate 30. The coolant 180 then exits the blade cover top plate 30 through at least one cooling ejection 430, 440, 450, and 460.

In one embodiment of the present invention, the method further comprises dividing the blade cover cooling apparatus 20 of FIG. 4 into the blade cover suction edge section 22 and the blade cover pressure edge section 24, where the blade cover suction edge section 22 has the first rib spacing 330 and the blade cover pressure edge section 24 has the second rib spacing 340. The first rib spacing 330 and the second rib spacing 340 are configured to control the coolant 180 in the blade cover suction edge section 22 and the blade cover pressure edge section 24, respectively.

In one embodiment of the present invention, the method further comprises disposing the blade cooling section 25 of FIG. 5 of the turbine blade 10 from about the blade cover 90 to about the blade root 100 (not shown in FIG. 5). The method further comprises disposing the blade cooling section 25 from about the turbine blade leading edge 260 to about the turbine blade trailing edge 270, where the blade cooling section 25 is disposed between the blade cover 90 and the blade root 100. The method further comprises disposing the blade cover bottom plate 40 over the blade cooling apparatus 25 so as to pass the coolant 180 form the blade cooling apparatus 25 to the blade cover bottom plate 40.

In one embodiment of the present invention, the method further comprises disposing the dividing rib 150 of FIG. 6 from about the upper airfoil surface 410 of an airfoil section 400 of the turbine blade 10 to about the lower airfoil surface 420 of the airfoil section 400 of the turbine blade 10. The method further comprises dividing both the blade cooling apparatus 25 into the leading edge cooling section 152 and the trailing edge cooling section 154 by the dividing rib 150. The method further comprises disposing the blade cover bottom plate 40 over at least a portion of the leading edge cooling section 152 and at least a portion of the trailing edge cooling section 154 so as to pass the coolant 180 from the leading edge cooling section 152 and the trailing edge cooling section 154 to the blade cover bottom plate 40.

In one embodiment of the present invention, the method further comprises forming the target area 300 of FIG. 7 in the blade cooling section 25 and disposing the blade cover bottom plate 40 over at least one edge of the target area 300.

In one embodiment of the present invention, the method further comprises disposing the pressure side double wall 360 of FIG. 8 of the turbine blade 10 and the suction side double wall 370 of the turbine blade 10 between the blade cover 90 and the blade root 100. The method further comprises disposing the blade cover bottom plate 40 over the pressure side double wall 360 and the suction side double wall 370 so as to pass the coolant 180 from the pressure side double wall 360 and the suction side double wall 370 to the blade cover bottom plate 40.

In one embodiment of the present invention, the method further comprises disposing the plurality of dividers 175 of FIG. 9 in the airfoil section 400 of the turbine blade 10 from about the lower airfoil surface 420 to about the upper airfoil surface 410 to direct the coolant 180 through the airfoil section 400. The method further comprises disposing the lower airfoil surface 420 on the blade root 100 and disposing the blade cover bottom plate 40 on the upper airfoil surface 410 so as to pass the coolant 180 from the airfoil section 400 to the blade cover bottom plate 40.

In one embodiment of the present invention, the method further comprises configuring at least one of the upper ribs 50 of FIG. 11, the lower ribs 60, the blade cover top plate 30 of FIG. 12, and the blade cover bottom plate 40 of FIG. 13 that is disposed to contact the coolant 180 with the plurality of concavities 310 thereon.

The present also provides an alternative method of fabricating the blade cover cooling apparatus 20 of FIG. 2 disposed in the blade cover 90 for the turbine blade 10. The method comprises forming the plurality of blade cover top plate channels 380 of FIG. 10 on one surface of the blade cover top plate 30. The method further comprises forming the plurality of blade cover bottom plate channels 390 on one surface of the blade cover bottom plate 40. The method further comprises disposing the blade cover top plate 30 over the blade cover bottom plate 40 so as to form the blade cover 90, where the blade cover bottom plate channels 390 are disposed to intersect the blade cover top plate channels 380. The blade cover 90 is configured to pass the coolant 180 from the blade cover bottom plate 40 to the blade cover top plate 30.

In one embodiment of the present invention, the method further comprises configuring at least a portion of one of the blade cover top plate channels 380, the blade cover top plate 30, the blade cover bottom plate channels 390, and the blade cover bottom plate 40 that is disposed to contact the coolant 180 with the plurality of concavities 310 thereon.

The present invention also provides an alternative method of fabricating the blade cover cooling apparatus 20 disposed in the blade cover 90 for the turbine blade 10. The method comprises forming the blade cooling section 25 of FIG. 5 of the turbine blade 10 between the blade cover 90 and the blade root 100 (not shown in FIG. 5) and disposing the blade cooling section 25 from the turbine blade leading edge 260 to the turbine blade trailing edge 270, where the blade cooling section 25 is disposed between the blade cover 90 and the blade root 100. The method further comprises constructing the lattice structure 320 of FIG. 11 comprising the blade cover top plate 30 comprising the plurality of upper ribs 50, the blade cover bottom plate 40 comprising the plurality of lower ribs 60, and the plurality of flow redirection areas 120. The upper ribs 50 are disposed at the first angle 130 of FIG. 1 with respect to the blade circumferential reference line 110, and the lower ribs 60 are disposed at the second angle 140 with respect to the blade circumferential reference line 110. The method further comprises processing the lattice structure 320 of FIG. 11 so as to form the blade cover cooling apparatus 20, where the blade cover cooling apparatus 20 comprising the blade cover top plate 30 and the blade cover bottom plate 40. The method further comprises aligning the blade cover top plate 30 over the blade cover bottom plate 40 to form the flow redirection areas 120. The method further comprises disposing the blade cover bottom plate 40 over the blade cooling apparatus 25 so as to pass the coolant 180 from the blade cooling apparatus 25 to the blade cover bottom plate 40. The method further comprises disposing the blade cover leading edge plate 35 of FIG. 1 to the blade cover top plate 30, the blade cover bottom plate 40, the blade cover suction side plate 70, and the blade cover pressure side plate 80. The method further comprises disposing the blade cover trailing edge plate 45 to the blade cover top plate 30, the blade cover bottom plate 40, the blade cover suction side plate 70, and the blade cover pressure side plate 80. The method further comprises disposing the blade cover suction side plate 70 to the blade cover top plate 30, the blade cover bottom plate 40, the blade cover leading edge plate 35, and the blade cover suction side plate 45. The method further comprises disposing the blade cover pressure side plate 80 to the blade cover top plate 30, the blade cover bottom plate 40, the blade cover leading edge plate 35, and the blade cover trailing edge plate 45. The blade cover 90 is configured to pass the coolant 180 from the blade cover bottom plate 40 to the blade cover top plate 30.

In one embodiment of the present invention, the method further comprises utilizing the ranges for the first angle 130 and the second angle 140 as provided above.

In one embodiment of the method of the present invention, the processing the lattice structure 320 of FIG. 11 so as to form the blade cover cooling apparatus 20 is performed by processes selected from the group consisting of investment casting, diffusion bonding, electron beam, and any combination thereof.

The foregoing description of several embodiments of the present invention has been presented for purposes of illustration. Although the invention has been described and illustrated in detail, it is to be clearly understood that the same is intended by way of illustration and example only and is not to be taken by way of limitation. Obviously many modifications and variations of the present invention are possible in light of the above teaching. Accordingly, the spirit and scope of the present invention are to be limited only by the terms of the appended claims.

What is claimed is:

1. A blade cover cooling apparatus disposed in a blade cover of a turbine blade comprising:
    a blade cover top plate comprising a plurality of upper ribs;
    a blade cover bottom plate comprising a plurality of lower ribs; and
    a plurality of flow redirection areas;
    said blade cover top plate disposed over said blade cover bottom plate;
    wherein said upper ribs are disposed at a first angle with respect to a blade circumferential reference line and said lower ribs are disposed at a second angle with respect to said blade circumferential reference line so as to form said flow redirection areas;
    wherein said blade cover bottom plate is disposed to so as to pass a coolant from said turbine blade to said blade cover top plate.

2. The apparatus of claim 1, wherein said blade cover has at least one cooling ejection.

3. The apparatus of claim 2, wherein said at least one cooling ejection is selected from the group consisting of blade cover leading edge cooling ejections, blade cover trailing edge cooling ejections, blade cover pressure side cooling ejections, blade cover suction side cooling ejections, and combinations thereof.

4. The apparatus of claim 1, wherein said first angle is not equal to said second angle.

5. The apparatus of claim 1 further comprising, a blade cover leading edge plate, a blade cover trailing edge plate, a blade cover suction side plate, and a blade cover pressure side plate;
    wherein said blade cover leading edge plate is disposed to said blade cover top plate, said blade cover bottom plate, said blade cover suction side plate, and said blade cover pressure side plate;
    wherein said blade cover trailing edge plate is disposed to said blade cover top plate, said blade cover bottom plate, said blade cover suction side plate, and said blade cover pressure side plate;
    wherein said blade cover suction side plate is disposed to said blade cover top plate, said blade cover bottom plate, said blade cover leading edge plate, and said blade cover trailing edge plate;
    wherein said blade cover pressure side plate is disposed to said blade cover top plate, said blade cover bottom plate, said blade cover leading edge plate, and said blade cover trailing edge plate;

wherein said blade cover top plate, said blade cover bottom plate, said blade cover leading edge plate, said blade cover trailing edge plate, said blade cover suction side plate, and said blade cover pressure side plate are disposed in an investment casting.

6. The apparatus of claim 1, wherein said turbine blade further comprises an airfoil section and a blade root;

wherein said airfoil section comprises an upper airfoil surface, a lower airfoil surface and a plurality of channels;

wherein said channels are disposed from about said upper airfoil surface to about said lower airfoil surface;

wherein said lower airfoil surface is disposed on said blade root;

wherein said blade cover bottom plate is disposed on said upper airfoil surface.

7. The apparatus of claim 1, wherein said turbine blade further comprises a blade cooling section;

wherein said blade cooling section is disposed between said blade cover and a blade root;

wherein said blade cooling section is disposed from about a turbine blade leading edge to about a turbine blade trailing edge;

wherein said blade cooling apparatus is disposed so as to pass said coolant (180) to said blade cover bottom plate.

8. The apparatus of claim 7, wherein said blade cooling apparatus further comprises a target area;

wherein said blade cover bottom plate is disposed over at least one edge of said target area;

wherein said target area is configured to pass said coolant to said blade cover bottom plate.

9. The apparatus of claim 1, wherein said turbine blade comprises at least one dividing rib and a blade cooling section;

wherein said blade cooling section is disposed from about said blade cover to about a blade root;

wherein said blade cooling section is disposed from about a turbine blade leading edge to about a turbine blade trailing edge;

wherein said dividing rib is disposed from about said blade cover to about said blade root;

wherein said dividing rib divides said blade cooling apparatus into a leading edge cooling section and a trailing edge cooling section;

wherein said leading edge cooling section and said trailing edge cooling section are configured so as to pass said coolant to said blade cover bottom plate.

10. The apparatus of claim 1, wherein said turbine blade comprises a pressure side double wall and a suction side double wall;

wherein said pressure side double wall and said suction side double wall are disposed between said blade cover and a blade root;

wherein said pressure side double wall and said suction side double wall are disposed so as to pass said coolant to said blade cover bottom plate.

11. The apparatus of claim 1, wherein said turbine blade further comprises an airfoil section and a blade root;

wherein said airfoil section comprises an upper airfoil surface, a lower airfoil surface, and a plurality of dividers;

wherein said dividers are disposed from about said upper airfoil surface to about said lower airfoil surface so as to direct said coolant in said airfoil section;

wherein said dividers are disposed from about a turbine blade trailing edge to about a turbine blade leading edge.

wherein said lower airfoil surface is disposed on said blade root;

wherein every other said divider is disposed to connect to said blade cover bottom plate and is further disposed to be spaced apart from said blade root;

wherein said blade cover is disposed on said upper airfoil surface so as to pass said coolant from said airfoil section to said blade cover bottom plate.

12. The apparatus of claim 1, wherein said blade cover cooling apparatus is divided into a blade cover suction edge section and a blade cover pressure edge section;

wherein said blade cover suction edge section has a first rib spacing and said blade cover pressure edge section has a second rib spacing, wherein said first rib spacing and said second rib spacing are configured to control said coolant in said blade cover suction edge section and said blade cover pressure edge section, respectively.

13. The apparatus of claim 1 further comprising a plurality of surface concavities;

wherein at least a portion of at least one of said upper ribs, said lower ribs, said blade cover top plate, and said blade cover bottom plate that faces said coolant has said plurality of surface concavities thereon.

14. A blade cover cooling apparatus disposed in a blade cover for cooling a turbine blade comprising:

a blade cover top plate comprising a plurality of top cover plate channels; and a blade cover bottom plate comprising a plurality of blade cover bottom plate channels;

said blade cover top plate disposed over said blade cover bottom plate so as to form said blade cover;

wherein said blade cover bottom plate channels are disposed so as to intersect said blade cover top plate channels;

wherein said blade cover is configured to pass a coolant from said blade cover bottom plate to said blade cover top plate.

15. The apparatus of claim 14, further comprising a plurality of surface concavities;

wherein at least a portion of at least one of said blade cover top plate channels, said blade cover bottom plate channels, said blade cover top plate, and said blade cover bottom plate that faces said coolant has said plurality of surface concavities thereon.

16. The apparatus of claim 14, wherein said plurality of blade cover top plate channels is produced by processes selected from the group consisting of Electro-Chemical Machining (ECM), Scanning Transmission Electron Microscope (STEM), and combinations thereof.

17. The apparatus of claim 14, wherein said plurality of blade cover bottom plate channels is produced by processes selected from the group consisting of Electro-Chemical Machining (ECM), Scanning Transmission Electron Microscope (STEM), and combinations thereof.

18. A blade cover cooling apparatus disposed in a blade cover for cooling a turbine blade comprising:

a blade cover top plate comprising a plurality of upper ribs;

a blade cover bottom plate comprising a plurality of lower ribs;

a blade cover leading edge plate;

a blade cover trailing edge plate;

a plurality of flow redirection areas;

a blade cover suction side plate; and a blade cover pressure side plate;

said blade cover top plate disposed over said blade cover bottom plate;

wherein said upper ribs are disposed at a first angle with respect to a blade circumferential reference line and said lower ribs are disposed at a second angle with respect to said blade circumferential reference line so as to form said flow redirection areas;

wherein said blade cover bottom plate is disposed to so as to pass a coolant from said turbine blade to said blade cover top plate;

wherein said blade cover comprises at least one cooling ejection;

wherein said blade cover leading edge plate is disposed to said blade cover top plate, said blade cover bottom plate, said blade cover suction side plate, and said blade cover pressure side plate;

wherein said blade cover trailing edge plate is disposed to said blade cover top plate, said blade cover bottom plate, said blade cover suction side plate, and said blade cover pressure side plate;

wherein said blade cover suction side plate is disposed to said blade cover top plate, said blade cover bottom plate, said blade cover leading edge plate, and said blade cover trailing edge plate;

wherein said blade cover pressure side plate is disposed to said blade cover top plate, said blade cover bottom plate, said blade cover leading edge plate, and said blade cover trailing edge plate;

wherein said blade cover top plate, said blade cover bottom plate, said blade cover trailing edge plate, said blade cover leading edge plate, said blade cover suction side plate, and said blade cover pressure side plate are disposed in an investment casting.

19. The apparatus of claim 18, wherein said at least one cooling ejection is selected from the group consisting of blade cover leading edge cooling ejections, blade cover trailing edge cooling ejections, blade cover pressure side cooling ejections, blade cover suction side cooling ejections and combinations thereof.

20. The apparatus of claim 18, wherein said first angle is not equal to said second angle.

21. The apparatus of claim 18, wherein said turbine blade further comprises an airfoil section and a blade root;

wherein said airfoil section comprises an upper airfoil surface, a lower airfoil surface and a plurality of channels;

wherein said channels are disposed from about upper airfoil surface to about said lower airfoil surface;

wherein said lower airfoil surface is disposed on said blade root;

wherein said blade cover bottom plate is disposed on said upper airfoil surface so as to pass said coolant from said airfoil section to said blade cover bottom plate.

22. The apparatus of claim 18, wherein said turbine blade further comprises a blade cooling section;

wherein said blade cooling section is disposed from about said blade cover to about a blade root;

wherein said blade cooling section is disposed from about a turbine blade leading edge to about a turbine blade trailing edge;

wherein said blade cooling apparatus is disposed so as to pass said coolant to said blade cover bottom plate.

23. The apparatus of claim 22 wherein said blade cooling apparatus further comprises a target area;

wherein said blade cover cooling apparatus is disposed over at least one edge of said target area;

wherein said target area is configured to pass said coolant to said blade cover bottom plate.

24. The apparatus of claim 18, wherein said turbine blade comprises at least one dividing rib and a blade cooling section;

wherein said blade cooling section is disposed from about said blade cover to about a blade root;

wherein said blade cooling section is disposed from about a turbine blade leading edge to about a turbine blade trailing edge;

wherein said dividing rib is disposed from about said blade cover to about said blade root;

wherein said dividing rib divides said blade cooling apparatus into a leading edge cooling section and a trailing edge cooling section;

wherein said leading edge cooling section and said trailing edge cooling section are disposed so as to pass said coolant to said blade cover bottom plate.

25. The apparatus of claim 18, wherein said turbine blade comprises a pressure side double wall and a suction side double wall;

wherein said pressure side double wall and said suction side double wall are disposed from said blade cover to a blade root;

wherein said blade cover cooling apparatus is disposed to said pressure side double wall and said suction side double wall so as to pass said coolant from said pressure side double wall and said suction side double wall to said blade cover bottom plate.

26. The apparatus of claim 18, wherein said turbine blade further comprises an airfoil section and a blade root;

wherein said airfoil section comprises an upper airfoil surface, a lower airfoil surface, and a plurality of dividers;

wherein said dividers are disposed from about said upper airfoil surface to about said lower airfoil surface so as to direct said coolant in said airfoil section;

wherein said dividers are disposed from about a turbine blade trailing edge to about a turbine blade leading edge;

wherein said lower airfoil surface is disposed on said blade root;

wherein every other said divider is disposed to connect to said blade cover bottom plate and is further disposed to be spaced apart from said blade root;

wherein said blade cover is disposed on said upper airfoil surface so as to pass said coolant from said airfoil section to said blade cover bottom plate.

27. The apparatus of claim 18 wherein said blade cover cooling apparatus is divided into a blade cover suction edge section and a blade cover pressure edge section;

wherein said blade cover suction edge section has a first rib spacing and said blade cover pressure edge section has a second rib spacing, wherein said first rib spacing and said second rib spacing are configured to control said coolant in said blade cover suction edge section and said blade cover pressure edge section, respectively.

28. The apparatus of claim 18 further comprising a plurality of surface concavities;
wherein at least a portion of at least one of said upper ribs, said lower ribs, said blade cover top plate, and said blade cover bottom plate that faces said coolant has said plurality of surface concavities thereon.

29. A method of fabricating a blade cover cooling apparatus configured to be disposed in a blade cover for a turbine blade comprising:
aligning a blade cover top plate, said blade cover top plate comprising a plurality of upper ribs disposed at a first angle with respect to a blade circumferential reference line, and a blade cover bottom plate, said blade cover bottom plate comprising a plurality of lower ribs disposed at a second angle with respect to said blade circumferential reference line to form a plurality of flow redirection areas between said blade cover top plate and said blade cover bottom plate.

30. The method of claim 29, wherein said first angle is not equal to said second angle.

31. The method of claim 29, further comprising, prior to aligning, fabricating said blade cover top plate and said blade cover bottom plate by a process selected from a group consisting of investment casting, diffusion bonding, electron beam, and any combination thereof.

32. The method of claim 29, wherein aligning comprises providing an investment casting mold which comprises said flow redirection areas, said upper ribs, and said lower ribs; and
pouring a blade cover material so as to form an investment casting;
wherein said investment casting comprises said blade cover top plate, said blade cover bottom plate, said upper ribs, and said lower ribs.

33. The method of claim 29, wherein aligning comprises joining said blade cover top plate and said blade cover bottom plate.

34. The method of claim 29 further comprising:
configuring at least a portion of at least one surface of said upper rib, said lower ribs, said blade cover top plate, and said blade cover bottom plate that is disposed to contact a coolant with a plurality of concavities thereon.

35. The method of claim 29, further comprising:
disposing a blade cooling section of said turbine blade from about said blade cover to about a blade root;
disposing said blade cooling section from about a turbine blade leading edge to about a turbine blade trailing edge; wherein said blade cooling section is disposed from about said blade cover to about a blade root; and
disposing said blade cover bottom plate over said blade cooling apparatus so as to pass a coolant form said blade cooling apparatus to said blade cover bottom plate.

36. The method of claim 29 further comprising:
forming a target area in said blade cooling section;
disposing said blade cover bottom plate over at least one edge of said target area.

37. The method of claim 29 further comprises:
disposing a dividing rib from about an upper airfoil surface of an airfoil section of said turbine blade to about a lower airfoil surface of said airfoil section of said turbine blade in a manner to divide said blade cooling apparatus into a leading edge cooling section and a trailing edge cooling section by said dividing rib;
disposing said blade cover bottom plate over at least a portion of said leading edge cooling section and at least a portion of said trailing edge cooling section so as to pass said coolant from said leading edge cooling section and said trailing edge cooling section to said blade cover bottom plate.

38. The method of claim 29 further comprising:
disposing a pressure side double wall of said turbine blade and a suction side double wall of said turbine blade from said blade cover to a blade root;
disposing said blade cover bottom plate over said pressure side double wall and said suction side double wall so as to pass said coolant from said pressure side double wall and said suction side double wall to said blade cover bottom plate.

39. The method of claim 29 further comprising:
disposing a plurality of dividers in an airfoil section of said turbine blade from about a lower airfoil surface to about an upper airfoil surface so as to direct a coolant in said airfoil section, wherein said dividers are disposed from about a turbine blade trailing edge to about a turbine blade leading edge, wherein said lower airfoil surface is disposed on said blade root;
disposing one end of every other said divider to said blade cover bottom plate and further disposing a second end of said every other said divider so as to be spaced apart from said blade root; and
disposing said blade cover on said upper airfoil surface so as to pass said coolant (180) from said airfoil section to said blade cover bottom plate.

40. The method of claim 29 further comprising:
dividing said blade cover cooling apparatus into a blade cover suction edge section and a blade cover pressure edge section;
wherein said blade cover suction edge section has a first rib spacing and said blade cover pressure edge section has a second rib spacing,
wherein said first rib spacings and said second rib spacing are configured to control said coolant in said blade cover suction edge section and said blade cover pressure edge section, respectively.

41. The method of claim 29 further comprising:
disposing a blade cover leading edge plate to said blade cover top plate, said blade cover bottom plate, a blade cover suction side plate, and a blade cover pressure side plate;
disposing a blade cover trailing edge plate to said blade cover top plate, said blade cover bottom plate, said blade cover suction side plate, and said blade cover pressure side plate;
disposing said blade cover suction side plate to said blade cover top plate, said blade cover bottom plate, said blade cover leading edge plate, and said blade cover trailing edge plate; and
disposing said blade cover pressure side plate to said blade cover top plate, said blade cover bottom plate, said blade cover leading edge plate, and said blade cover trailing edge plate.

42. The method of claim 29 further comprising:
disposing said blade cover top plate, said blade cover bottom plate, said blade cover leading edge plate, said blade cover trailing edge plate, said blade cover suction side plate, and said blade cover pressure sie plate in an investment casting.

43. A method of fabricating a blade cover cooling apparatus disposed in a blade cover for a turbine blade comprising:

forming a plurality of blade cover top plate channels on one surface of a blade cover top plate;

forming a plurality of blade cover bottom plate channels on one surface of a blade cover bottom plate;

disposing said blade cover top plate over said blade cover bottom plate so as to form said blade cover;

wherein said blade cover bottom plate channels are disposed to intersect said blade cover top plate channels;

wherein said blade cover is configured to pass a coolant from said blade cover bottom plate to said blade cover top plat.

44. The method of claim 43 further comprising:

configuring at least one of said blade cover top plate, said blade cover bottom plate channels, said blade cover bottom plate, and said blade cover top plate channels that is disposed to contact said coolant with a plurality of concavities thereon.

45. A method of fabricating a blade cover cooling apparatus disposed in a blade cover for a turbine blade comprising:

disposing a blade cooling section of said turbine blade from about said blade cover to about a blade root;

disposing said blade cooling section from about a turbine blade leading edge to about a turbine blade trailing edge;

constructing a lattice structure comprising a blade cover top plate comprising a plurality of upper ribs, a blade cover bottom plate comprising a plurality of lower ribs, and a plurality of flow redirection areas, wherein said upper ribs are disposed at a first angle with respect to a blade circumferential reference line and said lower ribs are disposed at a second angle with respect to said blade circumferential reference line;

processing said lattice structure so as to form said blade cover cooling apparatus, wherein said blade cover cooling apparatus comprises said blade cover top plate and said blade cover bottom plate, wherein said blade cover cooling apparatus is disposed to form said flow redirection areas;

disposing a blade cover leading edge plate to said blade cover top plate, said blade cover bottom plate, a blade cover suction side plate, and a blade cover pressure side plate;

disposing a blade cover trailing edge plate to said blade cover top plate, said blade cover bottom plate, said blade cover suction side plate, and said blade cover pressure side plate;

disposing said blade cover suction side plate to said blade cover top plate, said blade cover bottom plate, said blade cover leading edge plate, and said blade cover suction side plate;

disposing said blade cover pressure side plate to said blade cover top plate, said blade cover bottom plate, said blade cover leading edge plate, and said blade cover trailing edge plate; and disposing said blade cover bottom plate over said blade cooling apparatus so as to pass a coolant from said blade cooling apparatus to said blade cover bottom plate;

wherein said blade cover is configured so as to pass said coolant from said blade cover bottom plate to said blade cover top plate.

46. The method of claim 45, wherein said first angle is not equal to said second angle.

47. The method of claim 45, wherein said processing said lattice structure so as to form said blade cover cooling apparatus is performed by processes selected from a group consisting of investment casting, diffusion bonding, electron beam, and any combination thereof.

48. The method of claim 45 further comprising:

disposing at least a portion of at least one of said upper ribs, said lower ribs, said blade cover top plate, and said blade cover bottom plate that faces said coolant with a plurality of surface concavities thereon.

49. The method of claim 45 further comprising:

forming a target area in said blade cooling section; and disposing said blade cover bottom plateover at least one edge of said target area.

50. The method of claim 45 further comprising:

disposing a dividing rib from about an upper airfoil surface of an airfoil section of said turbine blade to about a lower airfoil surface of said airfoil section of said turbine blade in a manner to divide said blade cooling apparatus into a leading edge cooling section and a trailing edge cooling section by said dividing rib; and disposing said blade cover bottom plate over said leading edge cooling section and said trailing edge cooling section so as to pass said coolant from said leading edge cooling section and said trailing edge cooling section to said blade cover bottom plate.

51. The method of claim 45 further comprising:

dividing said blade cover cooling apparatus into a blade cover suction edge section and a blade cover pressure edge section;

wherein said blade cover suction edge section has a first rib spacing and said blade cover pressure edge section has a second rib spacing, wherein said first rib spacing and said second rib spacing are configured to control said coolant in said blade cover suction edge section and said blade cover pressure edge section, respectively.

* * * * *